US012723675B2

(12) United States Patent
Walcome et al.

(10) Patent No.: US 12,723,675 B2
(45) Date of Patent: Sep. 1, 2026

(54) SPIGOTLESS VARIABLE-TEMPERATURE FLUID (E.G., WATER) VALVE OPENABLE WITH A DISPENSING DEVICE AND WITH OPTIONAL BACK-PRESSURE RELIEF

(71) Applicant: Aquor Water Systems, Incorporated, Port Townsend, WA (US)

(72) Inventors: Cash Walcome, Port Townsend, WA (US); Richard Walcome, Port Townsend, WA (US); Kamil Slusarski, Port Townsend, WA (US); Leif Portmann-Bown, Port Townsend, WA (US); Micah Mutch, Port Townsend, WA (US)

(73) Assignee: Aquor Water Systems, Incorporated, Port Townsend, WA (US)

( * ) Notice: Subject to any disclaimer, the term of this patent is extended or adjusted under 35 U.S.C. 154(b) by 174 days.

(21) Appl. No.: 18/427,099

(22) Filed: Jan. 30, 2024

(65) Prior Publication Data

US 2024/0255068 A1 Aug. 1, 2024

Related U.S. Application Data

(60) Provisional application No. 63/442,102, filed on Jan. 30, 2023.

(51) Int. Cl.

*F16K 35/06* (2006.01)
*F16K 11/00* (2006.01)
*F16K 15/18* (2006.01)

(52) U.S. Cl.

CPC ............ *F16K 35/06* (2013.01); *F16K 15/184* (2021.08); *F16K 19/00* (2013.01)

(58) Field of Classification Search

CPC ......... F16K 35/06; F16K 15/184; F16K 19/00
See application file for complete search history.

(56) References Cited

U.S. PATENT DOCUMENTS 179,092 A 6/1876 Booth
209,460 A 10/1878 Clark
(Continued)

FOREIGN PATENT DOCUMENTS

CN 104728455 B 5/2017
DE 102015006094 A1 9/2016
(Continued)

OTHER PUBLICATIONS

Article 94(3) Communication dtd Sep. 3, 2025 for U.S. Appl. No. 18/303,235, a counterpart application of U.S. Appl. No. 18/303,235, 6 pgs.

(Continued)

*Primary Examiner* — P. Macade Nichols
(74) *Attorney, Agent, or Firm* — Bryan A. Santarelli; FisherBroyles, LLP

(57) ABSTRACT

An embodiment of a fluid valve includes a receptacle, cavity, mixer, and valve assembly. The receptacle has a protrusion configured to engage a groove of a valve-opening-and-fluid-dispensing device, and the cavity has a front end in communication with the receptacle and has a rear end. The mixer has hot and cold input ports and has an output port in communication with the rear end of the cavity. And the valve assembly is disposed in the cavity, configured to allow fluid to flow from the output port through the cavity in response to a valve-opening-and-fluid-dispensing device being disposed in the receptacle, and configured to prohibit fluid from flowing from the output port through the cavity in response to the valve-opening-and-fluid-dispensing device being absent from the receptacle. The valve may include a pressure-relief assembly and/or a unidirectional-valve assembly configured to relieve back pressure during insertion of the valve-opening-and-fluid-dispensing device into the receptacle.

23 Claims, 26 Drawing Sheets

(56) References Cited

U.S. PATENT DOCUMENTS

| | | | |
|---|---|---|---|
| 249,826 A | 11/1881 | Clark | |
| 252,888 A | 1/1882 | Matthews | |
| 299,858 A | 6/1884 | Schneider | |
| 846,537 A | 3/1907 | Whiteford | |
| 874,652 A | 12/1907 | Bailey | |
| 968,711 A | 8/1910 | Stevenson | |
| 1,067,583 A | 7/1913 | Brague | |
| 1,124,455 A | 1/1915 | Kemp et al. | |
| 1,263,792 A | 4/1918 | Mueller | |
| 1,268,160 A | 6/1918 | Sammons | |
| 1,575,547 A | 3/1926 | Conrad | |
| 1,788,449 A | 1/1931 | Catlin | |
| 2,034,933 A | 3/1936 | Wilson | |
| 2,292,674 A | 8/1942 | Terrell | |
| 2,630,131 A | 3/1953 | Jacob | |
| 3,011,520 A * | 12/1961 | Barkelew | F16K 19/00 137/382.5 |
| 3,106,935 A | 10/1963 | Gatzke | |
| 3,199,831 A | 8/1965 | Sully | |
| 3,494,373 A | 2/1970 | Horak | |
| 3,589,615 A | 6/1971 | Cummins | |
| 4,112,966 A | 9/1978 | Carlson | |
| 4,158,366 A | 6/1979 | Van Meter | |
| 4,178,956 A | 12/1979 | Fillman | |
| 4,298,166 A | 11/1981 | White | |
| 4,314,580 A | 2/1982 | Steinwand | |
| 4,473,244 A | 9/1984 | Hill | |
| 4,475,570 A | 10/1984 | Pike | |
| 4,538,637 A | 9/1985 | Williams | |
| 4,562,962 A | 1/1986 | Hartman | |
| 4,644,970 A | 2/1987 | Lowry | |
| 4,700,732 A | 10/1987 | Francisco | |
| 4,821,762 A | 4/1989 | Breneman | |
| 4,844,116 A | 7/1989 | Buehler | |
| 4,909,270 A | 3/1990 | Enterante, Sr. | |
| 4,971,097 A | 11/1990 | Hunley, Jr. | |
| 5,012,833 A | 5/1991 | Hunley, Jr. | |
| 5,029,603 A | 7/1991 | Ackroyd | |
| 5,158,105 A | 10/1992 | Conway | |
| 5,372,158 A | 12/1994 | Berfield | |
| 5,392,805 A | 2/1995 | Chrysler | |
| 5,533,546 A | 7/1996 | Dixon | |
| 5,632,303 A | 5/1997 | Almasy | |
| 5,740,831 A | 4/1998 | Denardo | |
| 5,765,816 A | 6/1998 | Chrysler | |
| 5,836,397 A | 11/1998 | Craig | |
| 6,024,175 A | 2/2000 | Moore, Jr. | |
| 6,178,982 B1 | 1/2001 | Longstreth | |
| 6,250,688 B1 | 6/2001 | Kirby | |
| 6,394,125 B2 | 5/2002 | White | |
| 6,394,132 B1 | 5/2002 | Walcome | |
| 6,450,264 B1 | 9/2002 | Christian | |
| 6,536,534 B1 | 3/2003 | Sundholm | |
| 6,644,340 B2 | 11/2003 | Rokkjaer | |
| 6,668,852 B1 | 12/2003 | Williamson | |
| 6,752,167 B1 | 6/2004 | Stanaland | |
| 6,808,127 B2 | 10/2004 | Mcnulty | |
| 7,331,399 B2 | 2/2008 | Multer | |
| 7,533,686 B2 | 5/2009 | Brattoli | |
| 7,565,912 B2 | 7/2009 | Klee | |
| 7,789,066 B2 | 9/2010 | Torii | |
| 7,896,024 B2 | 3/2011 | Korb | |
| 8,408,515 B2 | 4/2013 | Yamamoto | |
| 8,752,567 B2 | 6/2014 | Brazeau | |
| 8,931,571 B2 | 1/2015 | Sarkisyan | |
| 9,222,244 B2 | 12/2015 | Holt | |
| 11,186,970 B2 | 11/2021 | Walcome | |
| 11,242,673 B2 | 2/2022 | Walcome | |
| 2002/0040732 A1 | 4/2002 | Lloyd, Jr. | |
| 2006/0042693 A1 | 3/2006 | Holland | |
| 2006/0201553 A1 | 9/2006 | Poskin | |
| 2006/0255658 A1 | 11/2006 | Klee | |
| 2007/0056631 A1 | 3/2007 | Seppmann | |
| 2010/0096028 A1 | 4/2010 | Qiu | |
| 2016/0356402 A1 | 12/2016 | Ball | |
| 2018/0202133 A1* | 7/2018 | Walcome | E03C 1/108 |

FOREIGN PATENT DOCUMENTS

| | | | |
|---|---|---|---|
| GB | 1164982 | A | 9/1969 |
| KR | 20040015646 | A | 2/2004 |
| WO | 95/15219 | A1 | 6/1995 |
| WO | 2006/126222 | A1 | 11/2006 |
| WO | 2018136563 | A1 | 7/2018 |

OTHER PUBLICATIONS

International Search Report & Written Opinion mailed Jul. 10, 2023 for Application No. PCT/US2023/019142, a counterpart application of U.S. Appl. No. 18/427,099, 16 pgs.

Non-Final Office Action mailed Dec. 27, 2024 for U.S. Appl. No. 18/303,235, a corresponding application of U.S. Appl. No. 18/303,235 pgs.

International Search Report & Written Opinion mailed May 2, 2024 for Application No. PCT/US2024/013493, a counterpart application of U.S. Appl. No. 18/427,099, 9 pgs.

European Patent Office; International Searching Authority; "Notification of Transmittal of the International Search Report and the Written Opinion of the International Searching Authority, or the Declaration" dated May 8, 2024; PCT Application No. PCT/US2024/013493 filed Jan. 30, 2024; pp. 1-30 (2024).

Non-Final Office Action mailed Oct. 1, 2025 for U.S. Appl. No. 18/303,235; a corresponding application, 16 pgs.

Final Office Action mailed May 26, 2026 for U.S. Appl. No. 18/303,235, a corresponding application, 15 pgs.

Communication Pursuant to Article 94(3) from European Patent Office dated Jun. 17, 2026 for EP Application No. 23724495.9, a counterpart application, 4 pgs.

* cited by examiner 602
608
604
606
600

SPIGOTLESS VARIABLE-TEMPERATURE FLUID (E.G., WATER) VALVE OPENABLE WITH A DISPENSING DEVICE AND WITH OPTIONAL BACK-PRESSURE RELIEF

PRIORITY CLAIM AND RELATED PATENTS

This application claims benefit of U.S. Application 63/442,102, which is titled HOT/COLD FLUID (E.G., WATER) VALVE and which was filed 30 Jan. 2023. And this application is related to: U.S. patent application Ser. No. 18/303,235, which is titled FLUID VALVE OR HYDRANT, which was filed 19 Apr. 2023, and which claims benefit of U.S. Patent Application 63/442,102 filed 30 Jan. 2023 and U.S. Patent Application 63/332,636 filed 19 Apr. 2022, U.S. Pat. No. 11,242,673, which is titled ANTI-FREEZING WATER VALVE WITH OPTIONAL ANTI-SIPHON ASSEMBLY AND WATER-VALVE ACCESSORIES and which issued 8 Feb. 2022, U.S. Pat. No. 11,542,689, which is titled FIRE-SUPPRESSION WATER-INTAKE VALVE, FIRE-SUPPRESSION SPRINKLER HEAD CONFIGURED FOR RAPID INSTALLATION IN, AND RAPID REMOVAL FROM, THE WATER-INTAKE VALVE WITHOUT THE NEED TO INTERRUPT THE WATER SUPPLY, AND RELATED SYSTEMS AND METHOD and which issued 3 Jan. 2023, and U.S. Pat. No. 11,186,970, which is titled ANTI-FREEZING WATER VALVE CONFIGURED FOR UNDERGROUND (BURIED) USE WITH OPTIONAL ANTI-SIPHON ASSEMBLY, AND WATER-VALVE ACCESSORIES and which issued 30 Nov. 2021. All of the aforementioned patent applications and patents are incorporated herein by reference.

SUMMARY

Today's homeowners and home buyers, boat owners and boat buyers, recreational-vehicle (RV owners and RV buyers, farmers, ranchers, other business owners, a businesses' workers, and others may prefer a source of warm or hot water available outside of a structure (e.g., home, commercial building) for example, for better results (as compared to cold water) washing a vehicle or other object, or for "hosing down" or washing a pet or other animal, washing one's hands, or "rinsing off" one's self after a dip in a pool, lake, or the ocean, with water at a comfortable temperature.

Furthermore, these same people sometimes prefer an external water valve (e.g., mounted to, through, or in an external side of a structure such as a home, other building (e.g., a commercial building), boat, or RV, or in the ground) that is spigotless, such as, for example, a water valve described in U.S. Pat. No. 11,242,673, which is incorporated by reference.

Consequently, an embodiment of a fluid valve disclosed herein is a spigotless variable-temperature fluid valve, such as a variable-temperature water valve, configured for outdoor/external use and which combines the features of temperature control of the dispensed water and valve opening and closing without a spigot. Such an embodiment also may include one or more pressure-relief assemblies and/or one or more unidirectional-valve (e.g., check-valve) assemblies configured to relieve back pressure that may be generated, or that otherwise may exist, during operation of the fluid valve such as while one is inserting a valve-opening-and-fluid-dispensing device into the valve.

Another embodiment of a fluid valve is configured for coupling to a single (e.g., hot, cold) fluid outlet of a structure's fluid-supply-and-distribution system and includes one or more pressure-relief assemblies and/or one or more back-pressure-relieving unidirectional-valve assemblies.

Still another embodiment is a method for using, or otherwise operating, a spigotless variable-temperature fluid valve that may include one or more pressure-relief assemblies and/or one or more back-pressure-relieving unidirectional-valve assemblies.

Yet another embodiment is a structure, such as a home or other building, boat, or RV that includes, as an external water source, an embodiment of a spigotless variable-temperature water valve that may include one or more pressure-relief assemblies and/or one or more back-pressure-relieving valve assemblies.

Still another embodiment is a back-pressure-relieving unidirectional valve-assembly itself.

For example, an embodiment of a fluid valve includes a receptacle, cavity, mixer, and valve assembly. The receptacle has a protrusion configured to engage a groove of a valve-opening-and-fluid-dispensing device, and the cavity has a front end in communication with the receptacle and has a rear end. The mixer has hot and cold input ports and has an output port in communication with the rear end of the cavity. And the valve assembly is disposed in the cavity, configured to allow fluid to flow from the output port through the cavity in response to a valve-opening-and-fluid-dispensing device being disposed in the receptacle, and configured to prohibit fluid from flowing from the output port through the cavity in response to the valve-opening-and-fluid-dispensing device being absent from the receptacle. The valve also may include a pressure-relieve assembly and/or a unidirectional-valve assembly configured to relieve back pressure during insertion of the valve-opening-and-fluid-dispensing device into the receptacle.

And further in example, a unidirectional-valve assembly includes a body having a cavity and movable within a channel having ends, and a unidirectional valve (e.g., a check valve) disposable within the cavity.

BRIEF DESCRIPTION OF THE DRAWINGS

A more detailed understanding of the one or more embodiments disclosed herein may be had from the following description, given by way of example in conjunction with the accompanying drawings, wherein like reference numerals in the figures indicate like elements, and wherein.

DETAILED DESCRIPTION

In the following description, "approximate," approximately," "about," and "substantially," means that a quantity (e.g., a distance) can vary from a given value (e.g., 10 feet) by up to ±20% (e.g., ±20% of 10 feet=±2 feet, which means an "approximate" value of 10 feet can range from 10-2=8 feet to 10+2=12 feet), and means that a range a to b (e.g., of distance) can vary from up to $(a-20\%|b-a|)$ to $(b+20\%|b-a|)$ (e.g., an "approximate" range of 10 feet to 30 feet can range up to 6 feet to 34 feet).

Figure 1:
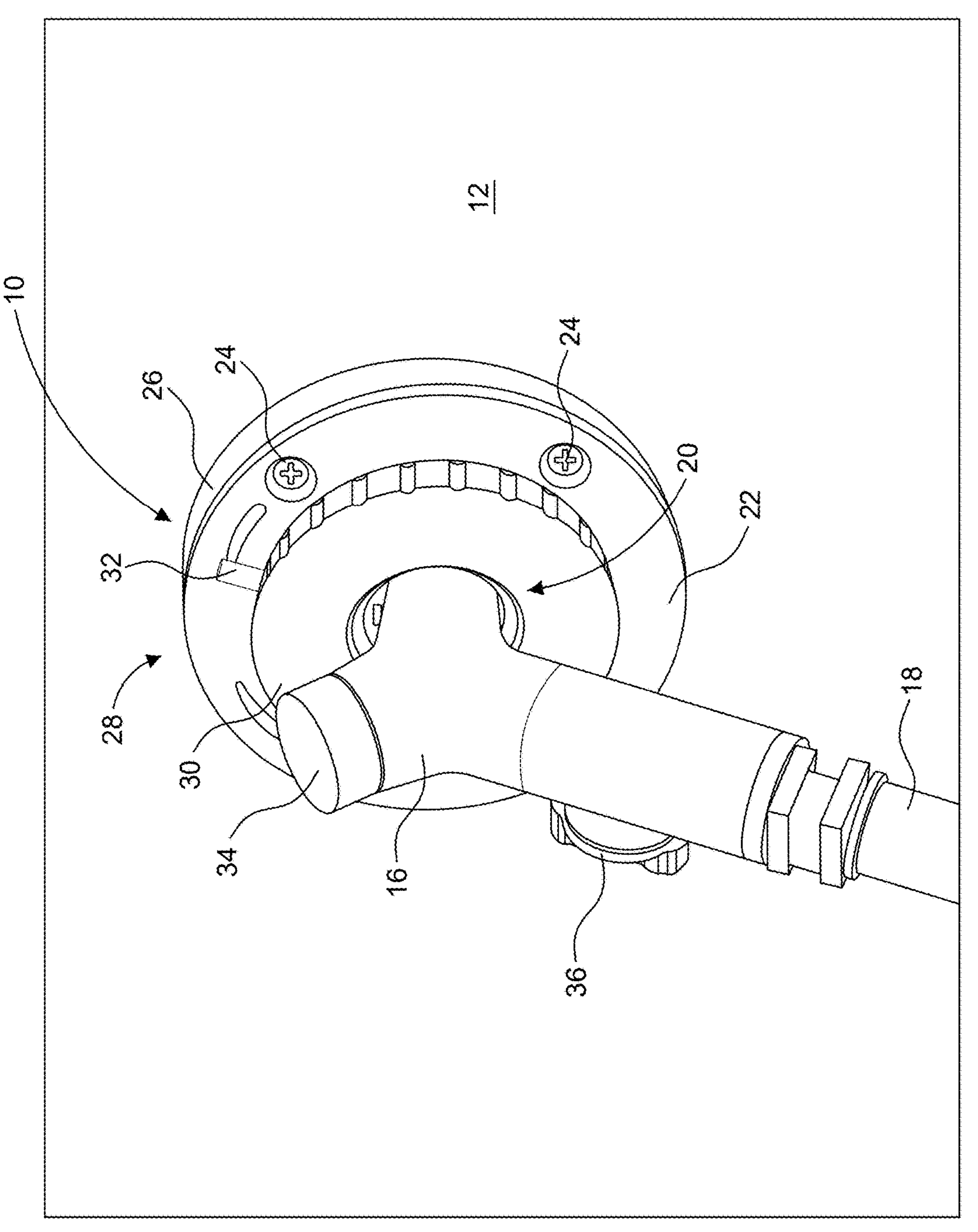
FIG. 1 is a front perspective view of a variable-temperature fluid valve installed through an external side of a structure, and of a valve-opening-and-fluid-dispensing device (with hose attached) installed in a receptacle of the valve, according to an embodiment.

FIG. 1 is a front perspective view of a variable-temperature fluid valve 10 installed through (e.g., in, on) an external side 12 of a structure 14, and of a valve-opening-and-fluid-dispensing device 16 (with hose 18 attached) installed in the valve, according to an embodiment.

In an embodiment described for purposes of example, the variable-temperature fluid valve 10 is a water valve coupled to hot-water and cold-water outlets (not visible in FIG. 1) of the structure's water-supply-and-distribution system (not visible in FIG. 1), the external side 12 is an exterior side, wall, or other partition (e.g., a roof), and the structure 14 is a residential home, shed, or barn. In other embodiments, the variable-temperature fluid valve 10 can be configured to dispense fluids other than liquid water and/or the structure can be a commercial building or a vehicle such as a boat or a recreational vehicle (RV).

The variable-temperature fluid valve 10 has a receptacle 20 configured to receive the device 16 and to dispense water via the device while the device is installed in the receptacle. That is, while it is installed in the receptacle 20, the device 16 opens the valve 10 such that water flows out of the device (and into the hose 18 if the hose is attached to the device).

The variable-temperature fluid valve 10 also has a face plate 22, mounting screws 24 (only two screws visible in FIG. 1) configured to mount the face plate to the side 12, and a wedge 26 disposed behind the face plate and having a taper (e.g., in a range of approximately 5°-10°) configured to angle the receptacle 20 relative to the side 12 such that after the valve-opening-and-fluid-dispensing device 16 is removed from the receptacle, any water remaining inside the valve can drain out of the receptacle. Such draining can prevent problems caused by water remaining in the valve 10, such problems including freezing-induced damage to the valve, mold growth, and/or rust or corrosion of one or more components of the valve.

The fluid valve 10 also has a temperature scale 28 formed (e.g., printed, painted, etched, engraved) on the front of the face plate 22 and a temperature-control dial 30 disposed over (e.g., in front of) the face plate 22 and including a temperature indicator (e.g., a temperature pointer) 32. As described below, the temperature-control dial 30 is configured so that one can control and/or otherwise adjust the temperature of water (or of any other fluid) flowing out of the device 16 via the receptacle 20 by rotating the temperature-dial clockwise or counterclockwise such that the temperature indicator 32 points to a desired temperature, or temperature range (e.g., the temperature range can be indicated by a color such as red for a hotter temperature and blue for a colder temperature), of the water dispensed via the receptacle 20 and valve-opening-and-fluid-dispensing device 16.

The valve-opening-and-fluid-dispensing device 16 can include an optional vacuum breaker (also called an anti-siphon mechanism) 34 for preventing a drop in water pressure within the structure's water-supply-and-distribution system from drawing water into the system via the hose 18, device 16, and valve 10. For example, some municipalities have building codes that require that an external (to a structure) connection to a structure's water-supply-and-distribution system include such a vacuum breaker. U.S. Pat. No. 11,242,673, which is incorporated herein by reference, discloses a vacuum breaker (called an "antisiphon assembly" in the '673 patent) suitable for use as the vacuum breaker 34. Furthermore, an embodiment of a valve-opening-and-fluid-dispensing device 16 including an antisiphon assembly is described below in conjunction with FIG. 25.

And to close ("turn off") the fluid valve 10, one removes, or otherwise disengages (by twisting as described below), the valve-opening-and-fluid-dispensing device 16 from the receptacle 20. Alternately, to stop the flow of water out of the valve-opening-and-fluid-dispensing device 16 without removing the device from the receptacle 20, one can rotate an on/off valve 36 of the device to the "off" position. U.S. Pat. No. 11,242,673, which is incorporated herein by reference, discloses an on/off valve suitable for use as the one/off valve 36.

Still referring to FIG. 1, alternate embodiments of the fluid valve 10 are contemplated. For example, the face plate 22, wedge 26, and temperature-control dial 30 may have shapes other than circular. Furthermore, a recessed "box" can be installed in the side 12 of the structure 14, and the variable-temperature fluid valve 10 can be installed in and/or through the recessed "box."

Figure 2:
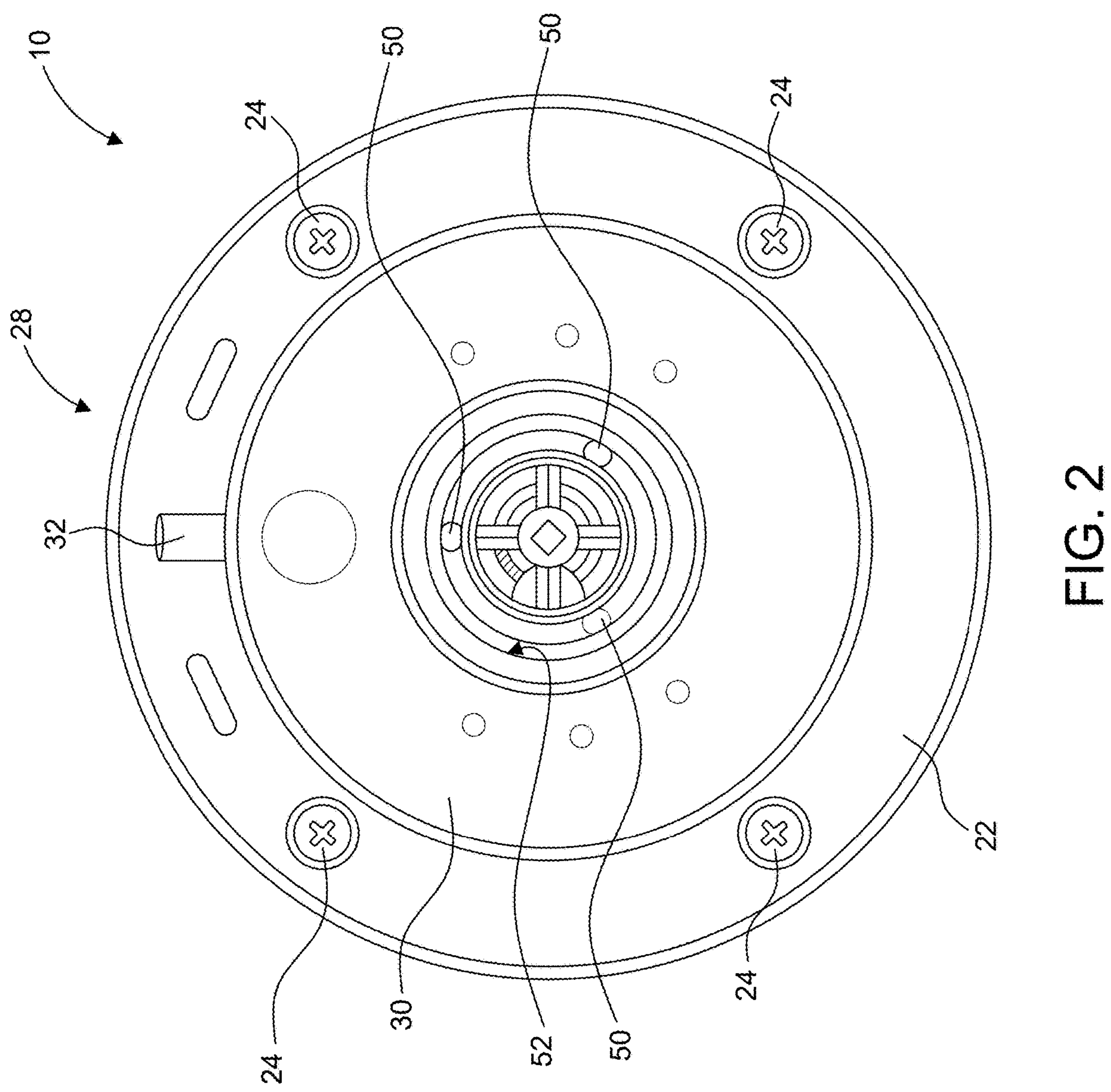
FIG. 2 is a front plan view of the variable-temperature fluid valve of FIG. 1, according to an embodiment.

FIG. 2 is a front plan view of the variable-temperature fluid valve 10 of FIG. 1, according to an embodiment in which the valve-opening-and-fluid-dispensing device 16 (FIG. 1) is not installed in the fluid valve.

The receptacle 20 includes at least one (three in an embodiment) engagement protrusion (sometimes called a "salient point") 50; if there are more than one protrusion, then the protrusions are approximately evenly distributed round an inner wall 52 of the receptacle. As described below in conjunction with FIGS. 6 and 7A-7D, the at least one protrusion is configured to engage a corresponding groove of the valve-opening-and-fluid-dispensing device 16 (FIG. 1).

Still referring to FIG. 2, alternate embodiments of the variable-temperature fluid valve 10 are contemplated. For example, the temperature scale 28 can be disposed at the bottom (or to either side) of the face plate 22 instead of at the top of the face plate; likewise, the temperature indicator 32 can be disposed adjacent to the temperature scale wherever on the faceplate the temperature indicator is disposed.

Figure 3:
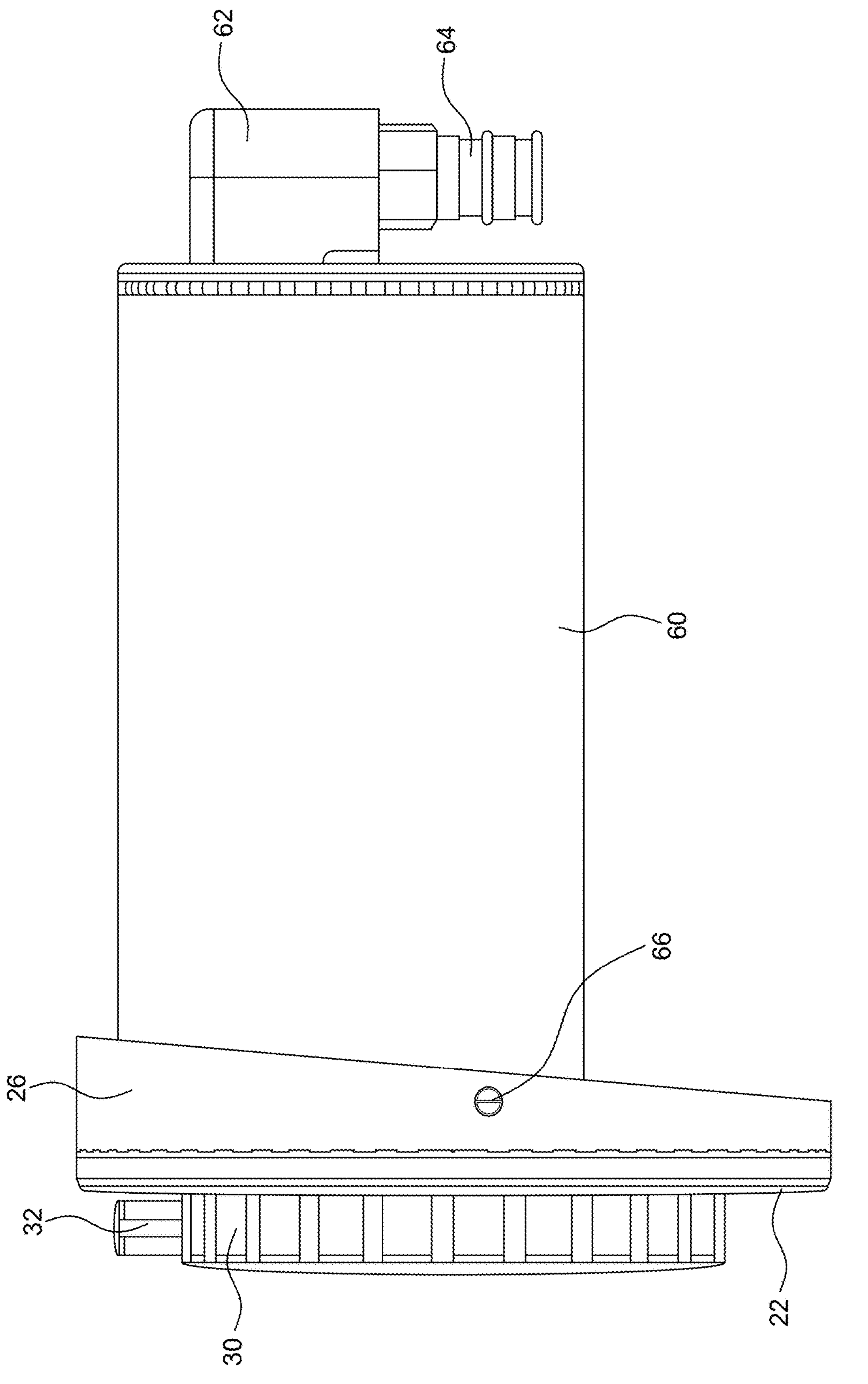
FIG. 3 is a side view of the variable-temperature fluid valve of FIGS. 1-2, according to an embodiment.

FIG. 3 is a side view of the variable-temperature fluid valve 10 of FIGS. 1-2, according to an embodiment.

The variable-temperature fluid valve 10 includes a sleeve 60 and, in an embodiment, angled (e.g., 90°) hot-fluid-inlet and cold-fluid-inlet couplers 62 (only one coupler visible in FIG. 3) and hot-fluid and cold-fluid inlets 64 (only one inlet visible in FIG. 3) coupled (e.g., via a threaded connection) to the hot-fluid-inlet and cold-fluid-inlet couplers. Hot-fluid and cold-fluid outlets (not visible in FIG. 3) of a structure's water-supply-and-distribution system (e.g., made from PEX tubing) can be press fitted and clamped to the hot-fluid and cold-fluid inlets 64. Furthermore, although called "hot-fluid" and "cold-fluid" inlets, the inlets 64 are configure to carry fluid at any two, typically different temperatures.

Furthermore, as described above in conjunction with FIG. 1, the wedge 26 is tapered, or otherwise angled (e.g., in a range of 5°-10°), such that when the variable-temperature fluid valve 10 is mounted to a surface such as to an exterior side of a building (where the side is approximately normal to the ground), the valve is angled downward so that any fluid remaining in the receptacle, and possibly within other locations of the valve, after the valve-opening-and-fluid-dispensing device 16 is removed from the receptacle, drains out of the valve via the receptacle due to the force of gravity. The wedge 26 is configured for sliding over the sleeve 60 from the rear (e.g., the end where the couplers 62 and inlets 64 are located) and for positioning behind the face plate 22, and can include an optional set screw 66, which is configured to hold the wedge in place.

Figure 4:
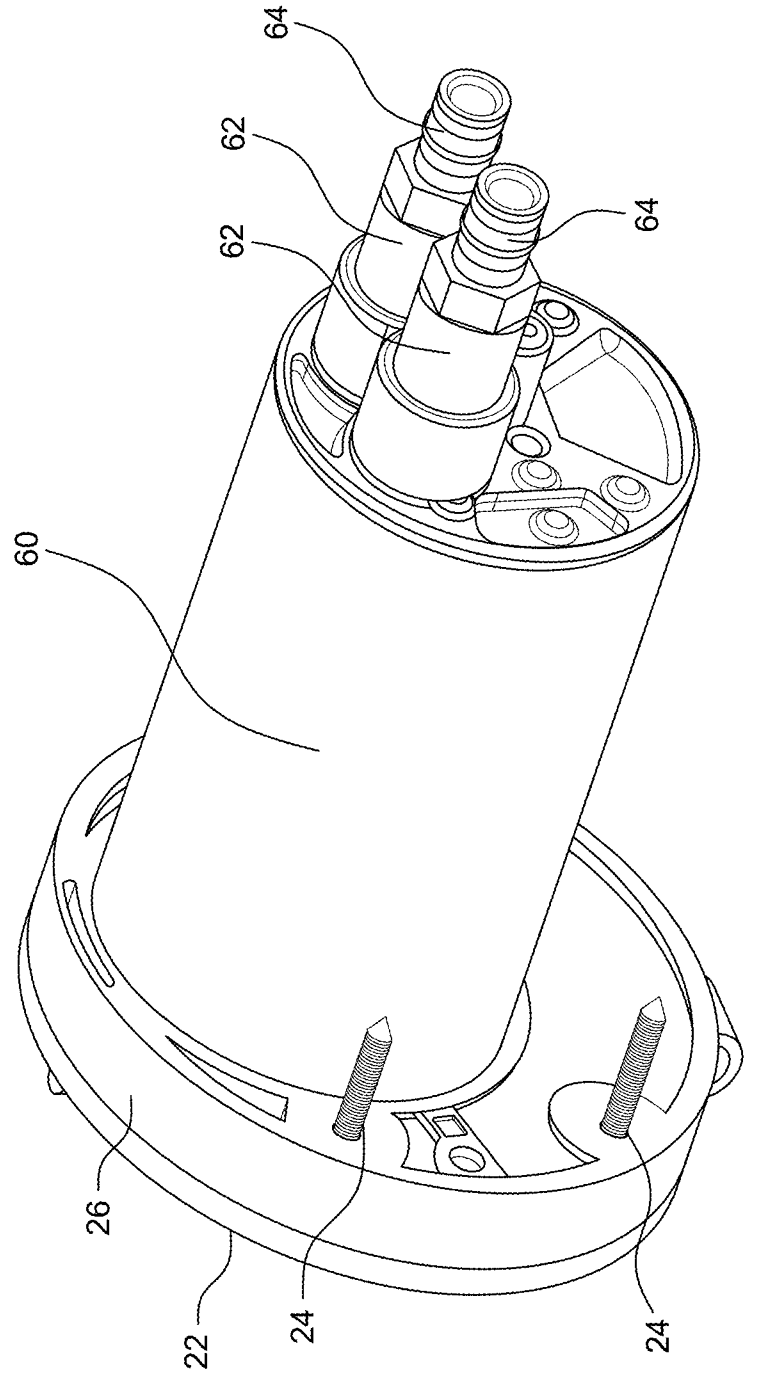
FIG. 4 is a rear isometric view of the variable-temperature fluid valve of FIGS. 1-3, according to an embodiment.

FIG. 4 is a rear isometric view of an embodiment of the variable-temperature fluid valve 10 having straight (e.g., 0°) hot-fluid-inlet and cold-fluid-inlet couplers 62, it being understood that but for the hot-fluid-inlet and cold-fluid-inlet couplers having a different angle, a rear isometric view of the embodiment of the variable-temperature fluid valve 10 of FIG. 3 would look similar.

Figure 5:
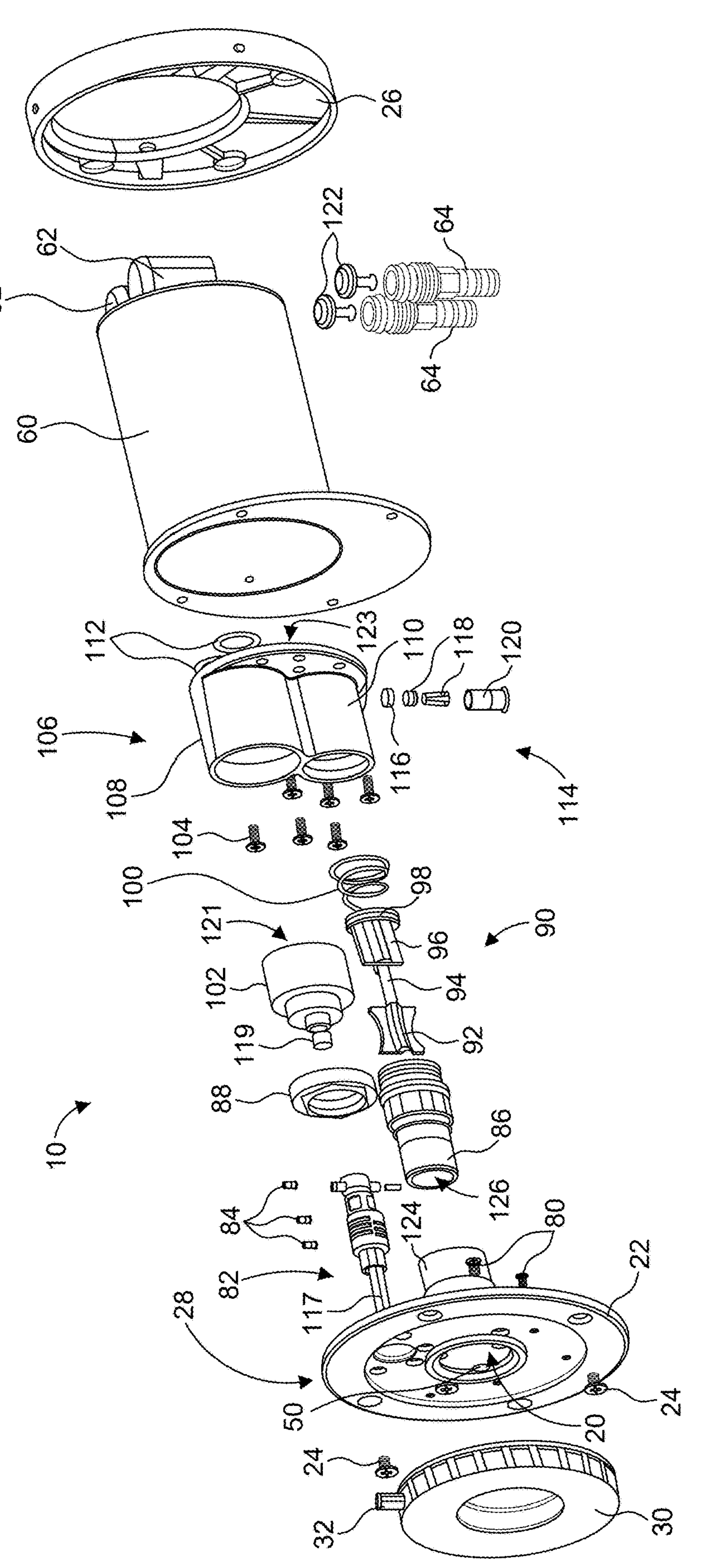
FIG. 5 is an exploded isometric view of the variable-temperature fluid valve of FIGS. 1-4, according to an embodiment.

FIG. 5 is an exploded isometric view of the variable-temperature fluid valve 10, according to an embodiment. In addition to the face plate 22, face-plate-securing screws 24, wedge 26, temperature scale 28, temperature-control dial 30 (e.g., control-knob subassembly), temperature indicator 32, protrusions 50, sleeve 60, hot-fluid-inlet and cold-fluid-inlet couplers 62, and hot-fluid and cold-fluid inlets 64, the variable-temperature fluid valve includes the following components: temperature-control dial securing screws 80, a mandrel subassembly 82 and mandrel set screws 84, rear hydrant barrel 86, mixing-cartridge packing nut 88, a valve assembly 90 including a member 92, valve (e.g., hydrant) operating rod 94, piston 96, seal (e.g., O-ring) 98, and an operating-rod spring 100, a hot-fluid/cold-fluid mixing cartridge (e.g., a conventional ceramic hot-fluid/cold-fluid mixing cartridge) 102, rear-hydrant securing screws 104 (six in total), rear-hydrant body 106 having an upper barrel 108 and a lower barrel 110, rear-hydrant-body (hot-fluid-inlet and cold-fluid-inlet) seals 112 (e.g., O-rings), optional pressure-relief valve 114 including a pressure-relief-valve gasket 116, pressure-relief-valve springs 118, and a pressure-relief-valve housing 120, and hot-fluid-inlet and cold-fluid-inlet unidirectional valves (e.g., check valves) 122.

The seals 112 form seals between the hot- and cold-fluid-input couplers 62 and a back surface 123 of the upper barrel 108 around openings aligned with hot-fluid and cold-fluid input ports (not visible in FIG. 5) at the rear end 121 of the mixer 102. Not visible are seals inside of the barrel 108 within which the hot-fluid and cold-fluid input ports of the mixer 102 are seated.

Furthermore, the mixer 102 is disposed within the upper barrel 108 of the rear hydrant body 106, and includes a mixed-fluid output port (not visible in FIG. 5) that empties into the upper barrel, which includes a coupling port (not visible in FIG. 5) that allows fluid to flow from the upper barrel into the bottom barrel 110 of the rear hydrant body (how fluid flows from the bottom barrel out through the receptacle 20 is described below in conjunction with FIGS. 8-11B).

Moreover, a rear coupling tube 124 of the face plate 22 and the rear-hydrant barrel 86 (and optionally the bottom barrel 110 of the rear-hydrant body 106) form a cavity 126 within which the valve assembly 90 is disposed.

In addition, the temperature-control dial 30 is configured to engage, rotatably, a stem 117 (e.g., a gear-toothed or splined stem) of the mandrel subassembly 82, which is configured to engage, rotatably, an adjuster stem 119 of the mixer 102. Rotating the adjuster stem 119 adjusts the hot-fluid-cold-fluid mixing ratio of the mixer 102 and, therefore, adjusts the temperature of the fluid dispensed through the receptacle 20; that is, the temperature of the dispensed fluid is related to the mixing ratio of the mixer, and the mixing ratio can be referenced to the flow from the cold-fluid input port or to the flow from the hot-fluid input port. For example, referencing the mixing ratio to the flow from the cold-fluid input port, if fluid flowing from the output port of the mixer 102 is 100% from the cold-fluid input port and is 0% from the hot-fluid input port, then the ratio is 1=(100% cold fluid in)/(100% fluid out). Conversely, if fluid flowing from the output port of the mixer 102 is 0% from the cold-fluid input port and is 100% from the hot-fluid input port, then the ratio is 0=(0% cold fluid in)/(100% fluid out). And if fluid flowing from the output port of the mixer 102 is 40% from the cold-fluid input port and is 60% from the hot-fluid input port, then the ratio is 2/5 (40% cold fluid in)/(100% fluid out). Further in example, referencing the mixing ratio to the flow from the hot-fluid input port, if fluid flowing from the output port of the mixer 102 is 100% from the cold-fluid input port and 0% from the hot-fluid input port, then the ratio is 0=(0% hot fluid in)/(100% fluid out). Conversely, if fluid flowing from the output port of the mixer 102 is 100% from the hot-fluid input port and 0% from the cold-fluid input port, then the ratio is 1=(100% hot fluid in)/(100% fluid out). And if fluid flowing from the output port of the mixer 102 is 75% from the hot-fluid input port and 25% from the cold-fluid input port, then the ratio is 3/4 (75% hot fluid in)/(100% fluid out). And the ratio also can be related to the amount of hot fluid into the mixer 102 to the amount of cold fluid in to the mixer, or the ratio can be related to the amount of cold fluid in to the mixer to the amount of hot fluid into the mixer.

The hot-fluid and cold-fluid inlets 64 are configured to be coupled (e.g., with threaded or fitted connections), respectively, to hot-fluid and cold-fluid outlets of a fluid-supply-and-distribution system (not shown in FIG. 5) of a structure in which the variable-temperature fluid valve 10 is installed or to which the variable-temperature fluid valve is attached.

The unidirectional valves (e.g., check valves) 122 are configured to prevent fluid from one of the hot-fluid or cold-fluid outlets (not shown in FIG. 5) of the fluid-supply-and-distribution system from flowing into the other one of the hot-fluid or cold-fluid outlets by allowing fluid to flow in only one direction, which is from the inlets 64 into the couplers 62.

As explained in conjunction with FIGS. 8-11B, the unidirectional valves 122 can cause a back pressure when one installs the valve-opening-and-fluid-dispensing device 16 (FIG. 1) in the receptacle 20.

The optional pressure-relief valve 114 is configured to relieve this back pressure by effectively and temporarily expanding the volume of the lower barrel 110. In a configuration from which the pressure-relief valve 114 is omitted, a plug (not visible in FIG. 5) can be configured for disposition within the pressure-relief-valve opening of the lower barrel 110 to plug the opening.

Alternate embodiments of the variable-temperature fluid valve 10 of FIG. 5 are contemplated, for example, alternate embodiments described above in conjunction with FIGS. 1-4 or below in conjunction with FIGS. 6-24. For example, the optional pressure-relief valve 114 can be omitted and one or more unidirectional-valve assemblies (described below) can be installed instead of the optional pressure-relief valve.

Figure 6:
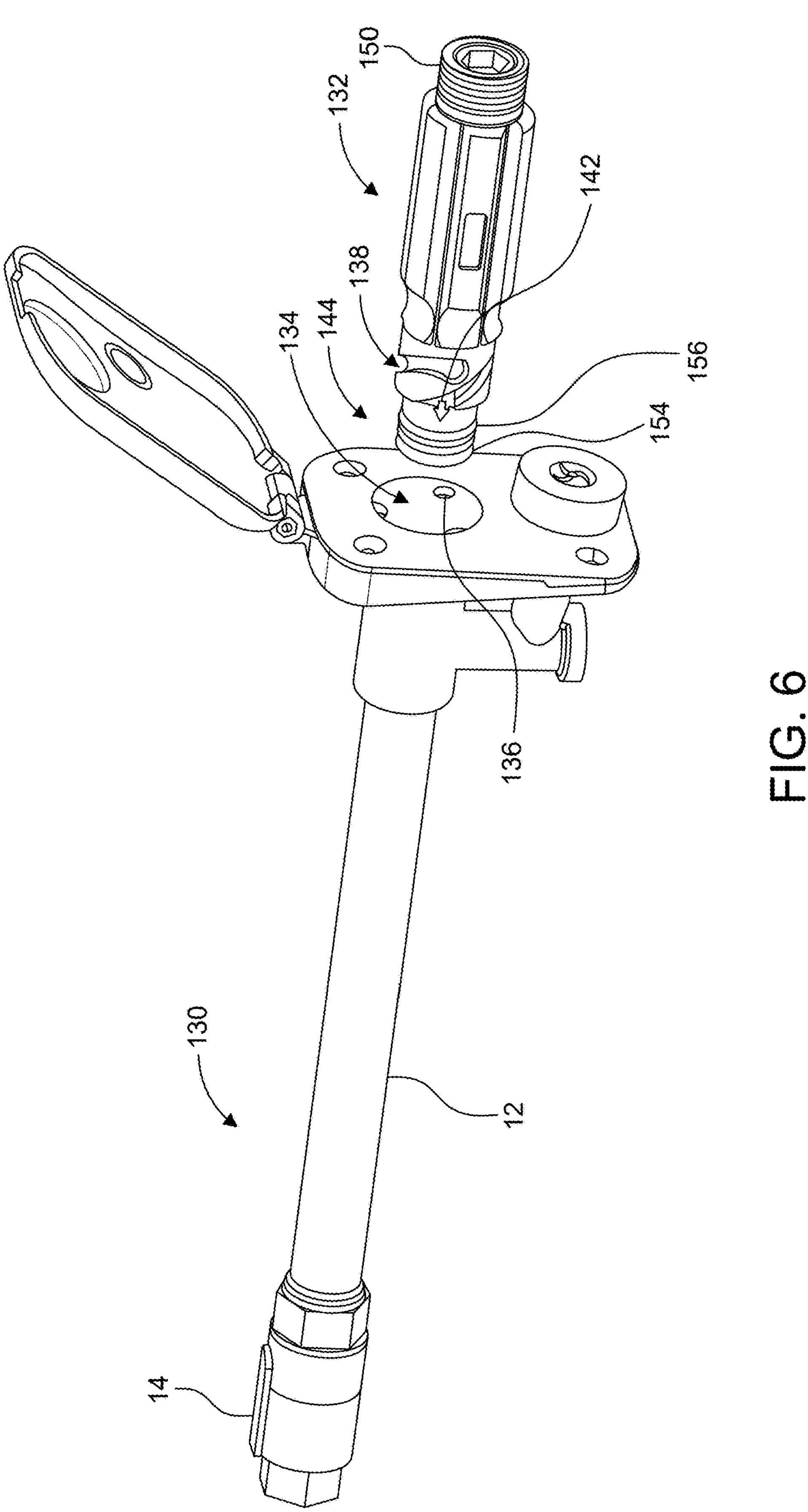
FIG. 6 is a side isometric view of a fluid valve having a receptacle similar to the receptacle of the variable-temperature fluid valve of FIGS. 1-5 and of a handle having one or more grooves similar to the one or more grooves of the valve-opening-and-fluid-dispensing device of FIGS. 1, 7A-7D, 8, 10, and 25, according to an embodiment.
Figures 7A, 7B, 7C, 7D:
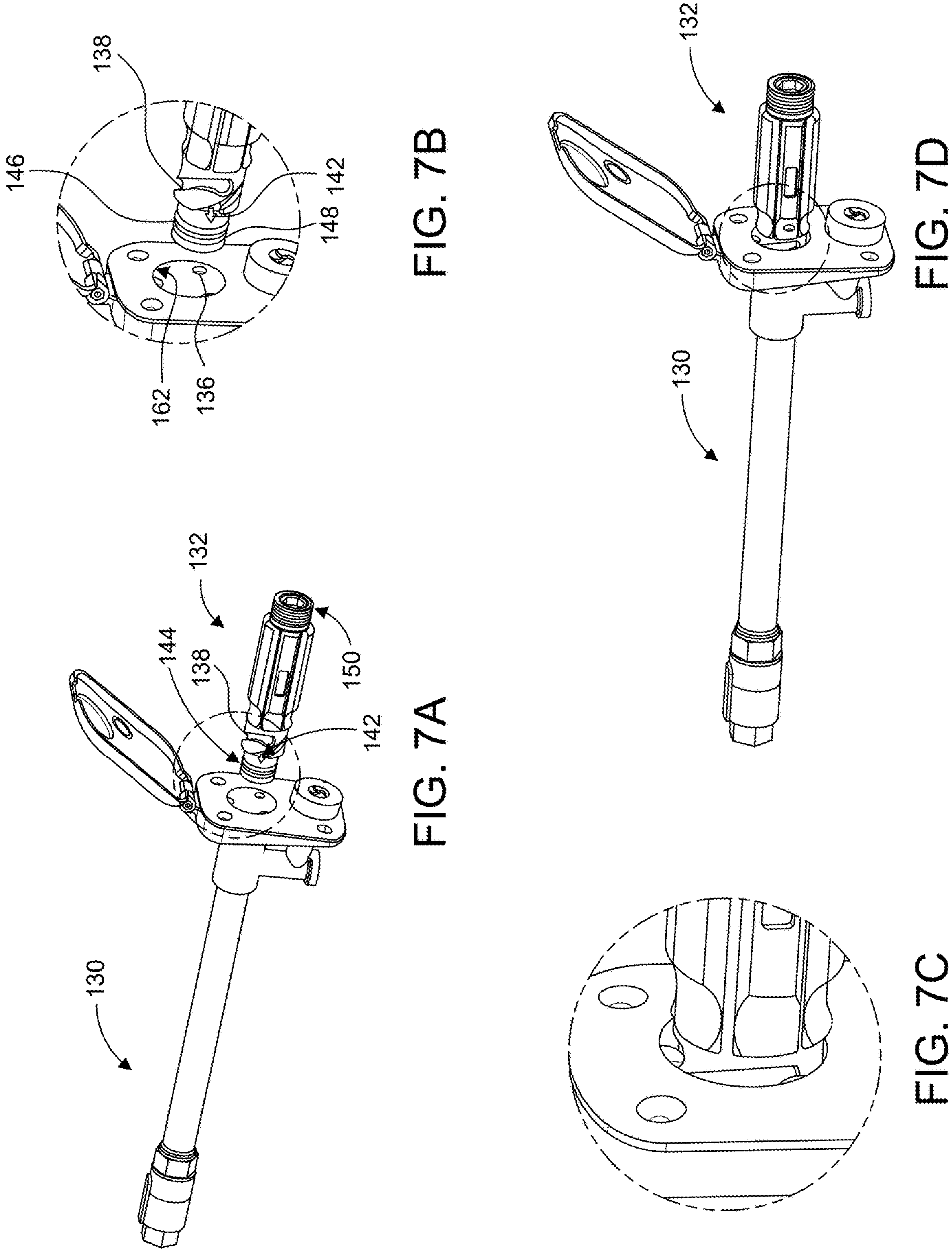
FIGS. 7A-7D are side isometric views of the fluid valve and handle of FIG. 6 and illustrate a procedure for inserting the handle into, and removing the handle from, the fluid valve by engaging/disengaging the receptacle with/from the handle, according to an embodiment.

FIGS. 6-7D illustrate attachment and detachment of the valve-opening-and-fluid-dispensing device 16 (FIG. 1) to and from the variable-temperature fluid valve 10 of FIGS. 1-5, according to an embodiment. Although FIGS. 6-7D show a water valve 130 and water handle 132 from U.S. Pat. No. 11,242,673, which is incorporated by reference, the relevant structures, and the attachment and detachment procedures, for the '673 water valve and water handle correspond to, and are similar to, the structures and the attachment and detachment procedures for the variable-temperature fluid valve 10 and the valve-opening-and-fluid-dispensing device 16. And in the description of the attachment and detachment of the device 16 to and from the fluid valve 10, items of the fluid valve and device that correspond to items of the water valve 130 and water handle 132 and that are visible in FIGS. 6-7D, 8, and 10, appear, in the text, within parentheses. Furthermore, where an item of the water valve 130 or water handle 132 is not visible in FIGS. 6-7D, 8, and 10, the text may reference only a corresponding item of the variable-temperature fluid valve 10 or valve-opening-and-fluid-dispensing device 16. And although the fluid described is water, it is understood that the attachment and detachment procedures for the variable-temperature fluid valve 10 and valve-opening-and-fluid-dispensing device 16 are similar for other fluids.

FIG. 6 is a side isometric view of the water valve 130 (10) having a receptacle 134 (20) and engagement protrusions 136 (50), which are similar to the receptacle 20 and the engagement protrusions 50 of the variable-temperature fluid valve 10 of FIGS. 1-5, and of the water handle 132 (16)

having one or more grooves 138 (140) similar to the one or more grooves 140 of the valve-opening-and-fluid-dispensing device 16 of FIGS. 1-5 (see FIGS. 8 and 10); similar to the device 16, the water handle 132 (16) is configured to open the water valve 130 (10) and to dispense water, according to an embodiment.

FIGS. 7A-7D are respective side isometric views of the water valve 130 (10) and of the water handle 132 (16) before and after the water handle is inserted into the water valve, according to an embodiment.

Figure 8:
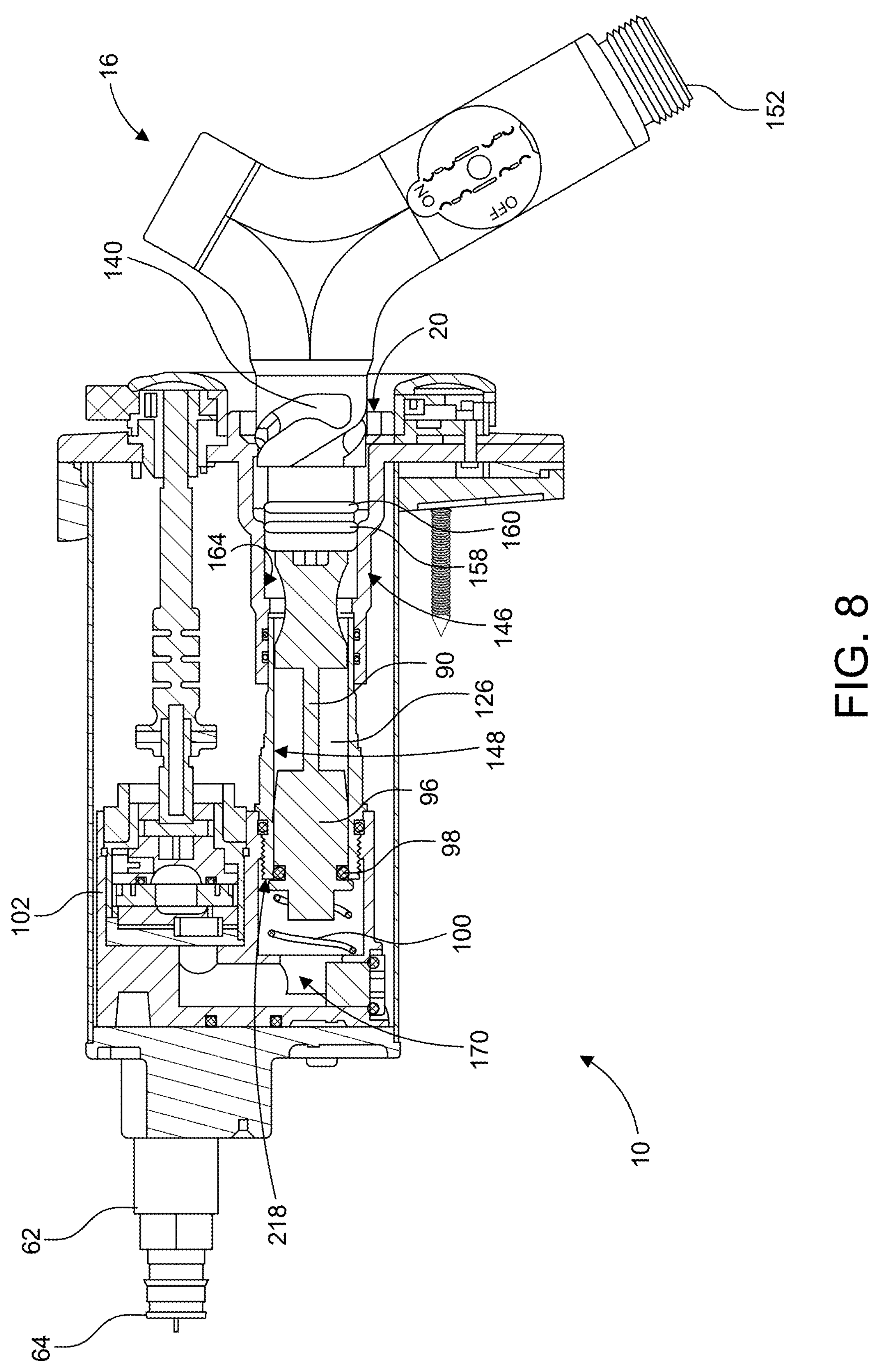
FIG. 8 is a side view with portions broken away of the fluid valve of FIGS. 1-5 and of the valve-opening-and-fluid-dispensing device of FIG. 1 partially inserted into the valve receptacle, according to an embodiment.

FIG. 8 is a side view, with portions broken away, of the variable-temperature fluid valve 10 of FIGS. 1-5 and of the valve-opening-and-fluid-dispensing device 16 of FIG. 1 partially inserted into the valve receptacle 20, according to an embodiment.

Figure 10:
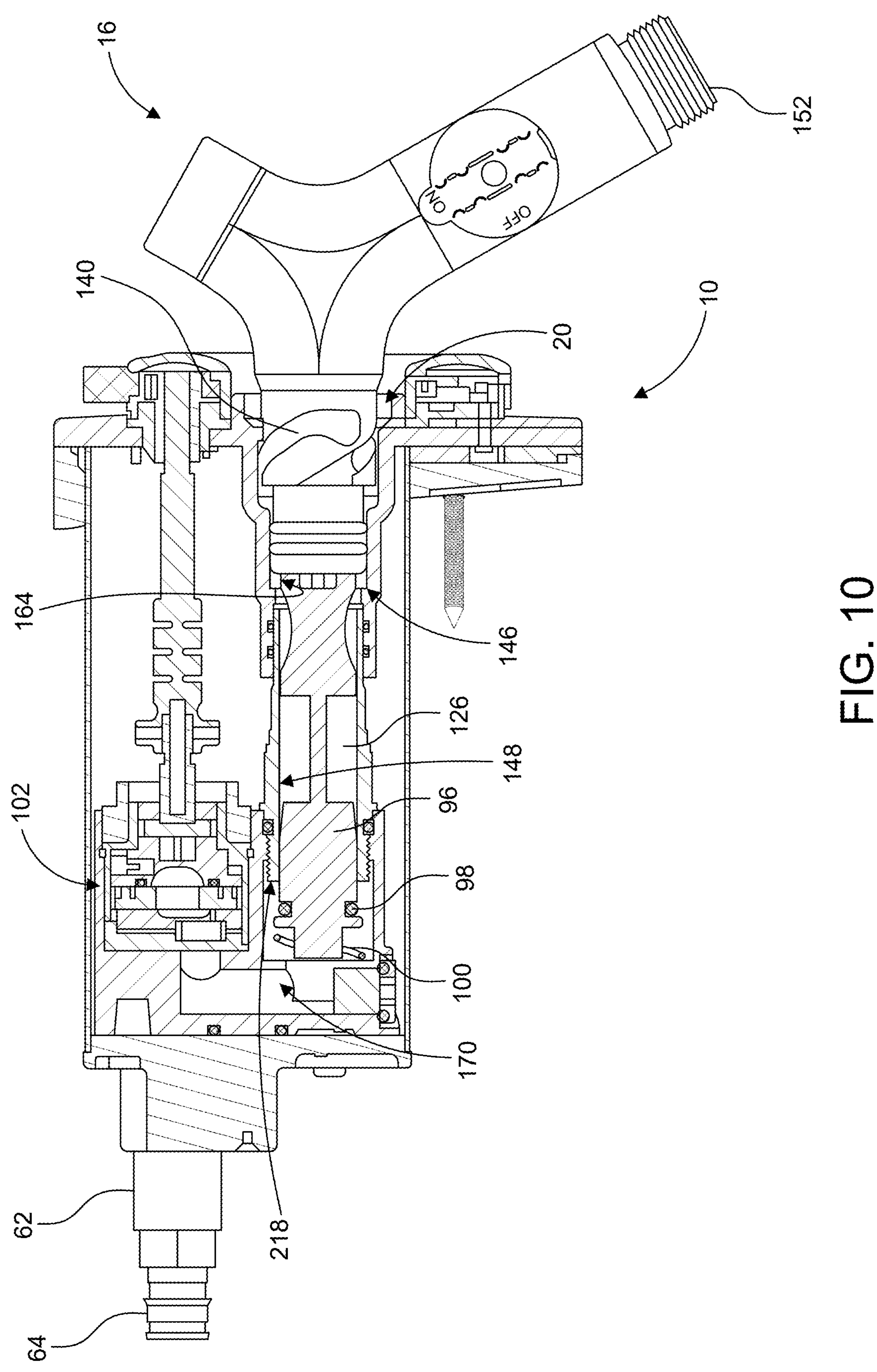
FIG. 10 is a side view, with portions broken away, of the fluid valve of FIG. 8 and of the valve-opening-and-fluid-dispensing device of FIG. 8 fully inserted into the valve receptacle, according to an embodiment.

And FIG. 10 is a side view, with portions broken away, of the variable-temperature fluid valve 10 of FIGS. 1-5 and 8 and of the valve-opening-and-fluid-dispensing device 16 of FIGS. 1 and 8 fully inserted into the valve receptacle 20, according to an embodiment.

Referring to FIGS. 5, 6-7D, 8, and 10, a procedure for inserting the water handle 132 (16) into the water valve 130 (10), and for thereafter dispensing water via the inserted water handle, is described, according to an embodiment in which the unidirectional valves 122 (FIG. 5) are omitted.

First, one grasps the water handle 132 (16), and aligns the arrow 142 with one of the protrusions 136 (50) disposed around an inner wall of the receptacle 134 (20).

Next, he/she inserts a rear end 144 (146) of the water handle 132 (16) into the receptacle 134 (20) and rotates the water handle clockwise. As he/she rotates the water handle 132 (16) clockwise, he/she applies a torque that causes spiral grooves 138 (140) on the outside of the rear end 144 (146) to engage the protrusions 136 (50) of the receptacle 134 (20). The engagement of the protrusions 136 (50) by the spiral grooves 138 (140) converts the torque being applied to the water handle 132 (16) into a linear force that moves the rear end 144 (146) of the water handle further into the receptacle 134 (20). If the linear force is strong enough to overcome the opposing force generated by the combination of the operating rod spring 100 (e.g., piston-return spring, FIG. 5) and the water pressure from the water-supply-and-distribution system (not visible in FIG. 6, 7A-7D, 8, or 10) of the structure in which the water valve 130 (10) is installed, then the rear end 144 (146) of the water handle 132 (16), via the member 92 and the operating rod 94 of the water-valve assembly 90, pushes the piston 96 and the piston-sealing ring 98 out from the water cavity 126 (FIGS. 5 and 8), and thus breaks the watertight seal between the sealing ring 98 and an inner surface 148 (FIG. 8) of the water cavity. Breaking the watertight seal allows water to flow from the inlets 64 and inlet couplers 62, through the mixer 102, the water cavity 126, and the receptacle 134 (20), into the rear end 144 (146) of the water handle 132 (16), and out from the front end 150 (152) of the water handle. A garden hose, or other water-dispensing tool (not shown in FIG. 5, 6-7D, 8, or 10), can be coupled to the front end 150 (152) of the water handle 132 (16) to direct the dispensed water as one may desire. The two seal rings (e.g., O-rings) 154 and 156 (158 and 160) form a watertight seal between an interior wall 162 (164) of the receptacle 134 (20) and the rear end 144 (146) of the water handle 132 (16) such that little or no water leaks from the region between the rear end of the water handle and the interior wall of the receptacle. The dual sealing rings 154 and 156 (158 and 160) also prevent one from being "squirted" or splashed as water flows into the water cavity 126 before the rear end 144 (146) of the water handle 132 (16) is fully inserted into, and fully seated within, the receptacle 134 (20).

Furthermore, the magnitude of torque required to fully insert the rear end 144 (146) of the water handle 132 (16) into the receptacle 134 (20) can depend on the number of protrusions 136 (50) and spiral grooves 138 (140) (the number or protrusions typically equals the number of grooves). Generally, the higher the number of protrusions 136 (50) and grooves 138 (140), the lower the magnitude of torque required. It has been determined that three protrusions 136 (50) and three grooves 138 (140) are sufficient to allow a woman of average strength to install the water handle 132 (16) into the receptacle 134 (20) for a typical expected range of residential water pressure (e.g., 20 pounds per square inch (PSI)-120 PSI).

Moreover, once the rear end 144 (146) of the water handle 132 (16) is fully inserted into the receptacle 134 (20), the protrusions 136 (50) and the spiral grooves 138 (140) are configured to retain the fully inserted water handle within the receptacle (e.g., configured to maintain the water handle fully inserted into the receptacle) as long as the pressure of the water within the water cavity 126 does not exceed a pressure for which the water valve 130 (10) and water handle 132 (16) are configured.

Still referring to FIGS. 5, 6-7D, 8, and 10, to remove the water handle 132 (16) and, therefore, to close the water valve 130 (10), one rotates the water handle counterclockwise. The disengagement of the protrusions 136 (50) by the spiral grooves 138 (140) converts the torque being applied to the water handle 132 (16) into a linear force that moves the rear end 144 (146) of the water handle out from the receptacle 134 (20); the water pressure in a region 170 (FIGS. 8 and 10) and the piston-return spring 100 add to this water-handle-removing linear force. Therefore, as the water handle 132 (16) is being removed, the rear end 144 (146) of the water handle, via the member 92 and the rod 94 of the fluid-valve assembly 190, releases the piston 96 and the piston-sealing ring 98 such that the water pressure in the region 170 and the piston-return spring 100 urge the piston and the piston-sealing ring toward, and into, the cavity 126 to re-establish the watertight seal between the piston-sealing ring 98 and the cavity wall 148 (see FIG. 8).

Furthermore, the dual sealing rings 154 and 156 (158 and 160) on the outside of the rear end 144 (146) of the water handle 132 (10) prevent one from being "squirted" or splashed with water as one disengages the rear end 144 (146) from the receptacle 134 (20). Without the presence of the two sealing rings 154 and 156 (158 and 160), such squirting or splashing could be caused by back water pressure in the garden hose, or other device, attached to a front end 150 (152) of the water handle 132 (16).

After one removes the rear end 144 (146) of the water handle 132 (16) from the receptacle 134 (20), any water remaining in the water cavity 126 drains out via the receptacle due to a gravity-induced flow (caused by the wedge 26), which draining prevents standing water from forming and freezing inside of the water cavity.

Still referring to FIGS. 6-7D, 8, and 10, alternate embodiments are contemplated for the variable-temperature fluid valve 10, the valve-opening-and-fluid-dispensing device 16, the procedure for inserting the device 16 into the receptacle 20, and the procedure for removing the device from the receptacle. For example, the fluid valve 10 can include two, or more than three, protrusions 50, and the valve-opening-and-fluid-dispensing device (or other handle or device) 16 can include two, or more than three, spiral grooves 140.

Furthermore, the grooves 140 can be configured so that one turns the valve-opening-and-fluid-dispensing device 16 in a counterclockwise direction to insert the device into the receptacle 20, and in a clockwise direction to remove the device from the receptacle. Moreover, variable-temperature fluid valve 10 and the valve-opening-and-fluid-dispensing device 16 can be formed from any suitable material (or combination of materials) such as metal (e.g., stainless steel) or a polymer (e.g., PVC), and can be formed from one material (e.g., PVC) even when the protrusions 50 are formed from another material (e.g., stainless steel).

Referring again to FIGS. 5, 8, and 10, a problem that can occur if the unidirectional valves 122 are installed between the inlet couplers 62 and the inlets 64 and the fluid is a liquid (e.g., water) is that backpressure in the region 170 can impede the installation of the valve-opening-and-fluid-dispensing device 16 into the receptacle 20. Without the unidirectional valves 122 installed, although a liquid can be incompressible or nearly so, when the device 16 begins to push the piston 96 and seal 98 out from the cavity 126, back pressure in the region 170 is transferred to the water-supply-and-distribution system (not shown in FIG. 8) of the structure in which the variable-temperature fluid valve 10 is installed via the output port and input ports of the mixer 102, inlet couplers 62, and inlets 64, and is relieved in the water-supply-and-distribution system due to typical "give" in the system—"give" can be due, for example, to air bubbles in the system or one or more open valves (e.g., a running faucet or shower or flushing toilet) that are part of, or that are attached to, the system. But with the unidirectional valves 122 installed, the back pressure in the region 170 is not, and cannot be, transferred to the water-supply-and-distribution system; therefore, the back pressure cannot be relieved in the water-supply-and-distribution system.

Referring to FIG. 5, an embodiment of the fluid valve 10 that can overcome this potential problem includes the pressure-relief valve 114. Referring to FIGS. 5 and 8, the valve-opening-and-fluid-dispensing device 16, as it is being installed, urges the piston 96 and seal 98 out from the cavity 126, giving rise to a back pressure in the region 170. But this back pressure causes the pressure-relief valve 114 to expand (e.g., the housing 120 actually extends out, or "pops out," from the lower barrel 110 of the rear hydrant 106) and, therefore, to relieve the back pressure while one is installing the device 16 enough so that the back pressure does not impede the installation. For example, the pressure-relief valve 114 may be configured to begin expanding at approximately a specified pressure that is greater than a pressure that the pressure-relief valve would experience during periods when the valve-opening-and-fluid-dispensing device 16 is not being installed. After the seal between the seal 98 and cavity surface 148 is broken, fluid starts to flow from the inlet 64, through the mixer 102 and region 170, into the cavity 126, through the receptacle 20, and out from the device 16, and this fluid flow causes the back pressure to dissipate. In response to the dissipating back pressure in the region 170, the pressure-relief valve 114 retracts back into (e.g., "pops back into") its original state in the lower barrel 10 by action of the springs 118. For example, the pressure-relief valve 114 may be configured to begin retracting at approximately a specified pressure that may or may not be the same as the specified pressure at which the pressure-relieve valve is configured to expand.

Referring to FIGS. 8-11B, another embodiment of the variable-temperature fluid valve 10 that can overcome the potential problem of back pressure in the region 170 impeding the installation of the valve-opening-and-dispensing device 16 includes unidirectional-valve assemblies 180 and 182 (one for each of the hot- and cold-fluid inlets 64) that are configured to provide unidirectional fluid flow and also to relieve such back pressure, according to an embodiment.

Figure 9A:
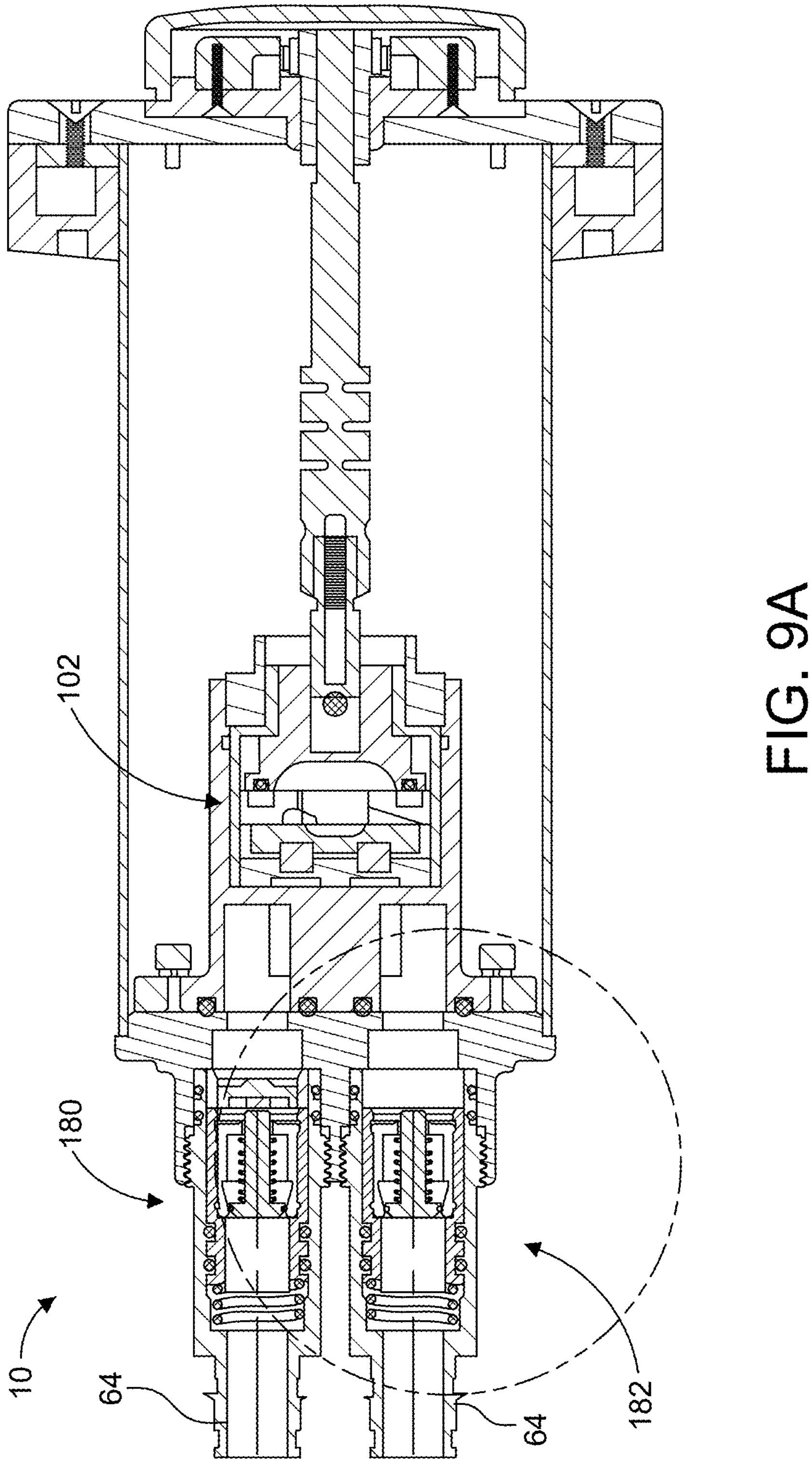
FIG. 9A is a plan view, with portions broken away, of the fluid valve of FIG. 8 and of hot-fluid and cold-fluid unidirectional-valve assemblies before, and just (e.g., a fraction of a second) after, the valve-opening-and-fluid-dispensing device breaks the cavity seal, according to an embodiment.

FIG. 9A is a plan view, with portions broken away, of the variable-temperature fluid valve 10 of FIG. 8 including unidirectional-valve assemblies 180 (e.g., for the hot-fluid inlet) and 182 (e.g., for the cold-fluid inlet) as they are (e.g., in a corresponding state such as an operational state) while one is inserting the valve-opening-and-fluid-dispensing device into the receptacle 20 of the fluid valve 10 but before, and just (e.g., a fraction of a second) after, the valve-opening-and-fluid-dispensing device 16 causes the seal between the cavity wall 148 and the seal 98 (FIG. 8) to break, according to an embodiment.

Figure 9B:
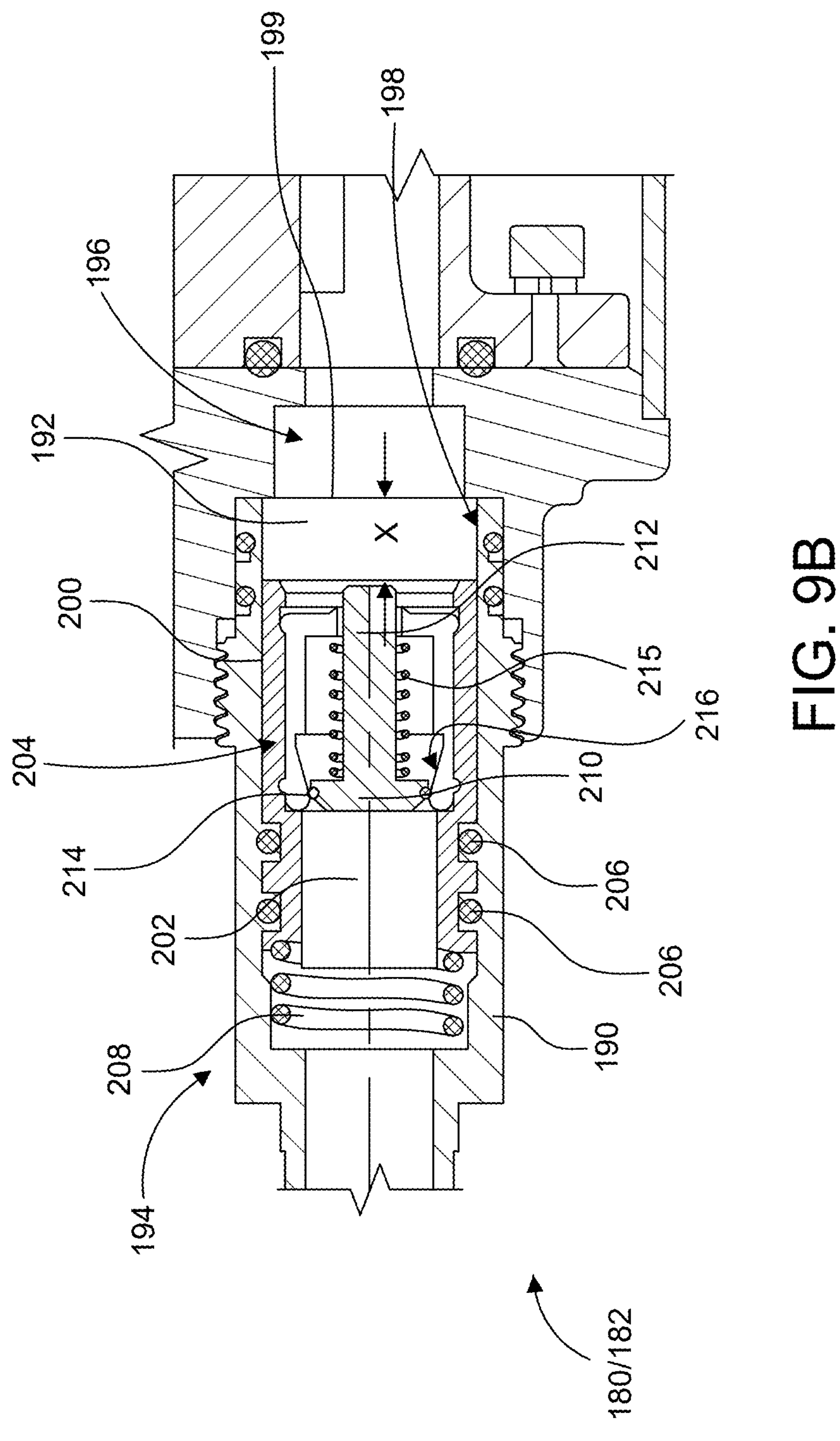
FIG. 9B is a magnified view of one of the unidirectional-valve assemblies of FIG. 9A, according to an embodiment.

FIG. 9B is a magnified view of one of the unidirectional-valve assemblies 180 and 182 of FIG. 9A, according to an embodiment.

Figures 11A, 11B:
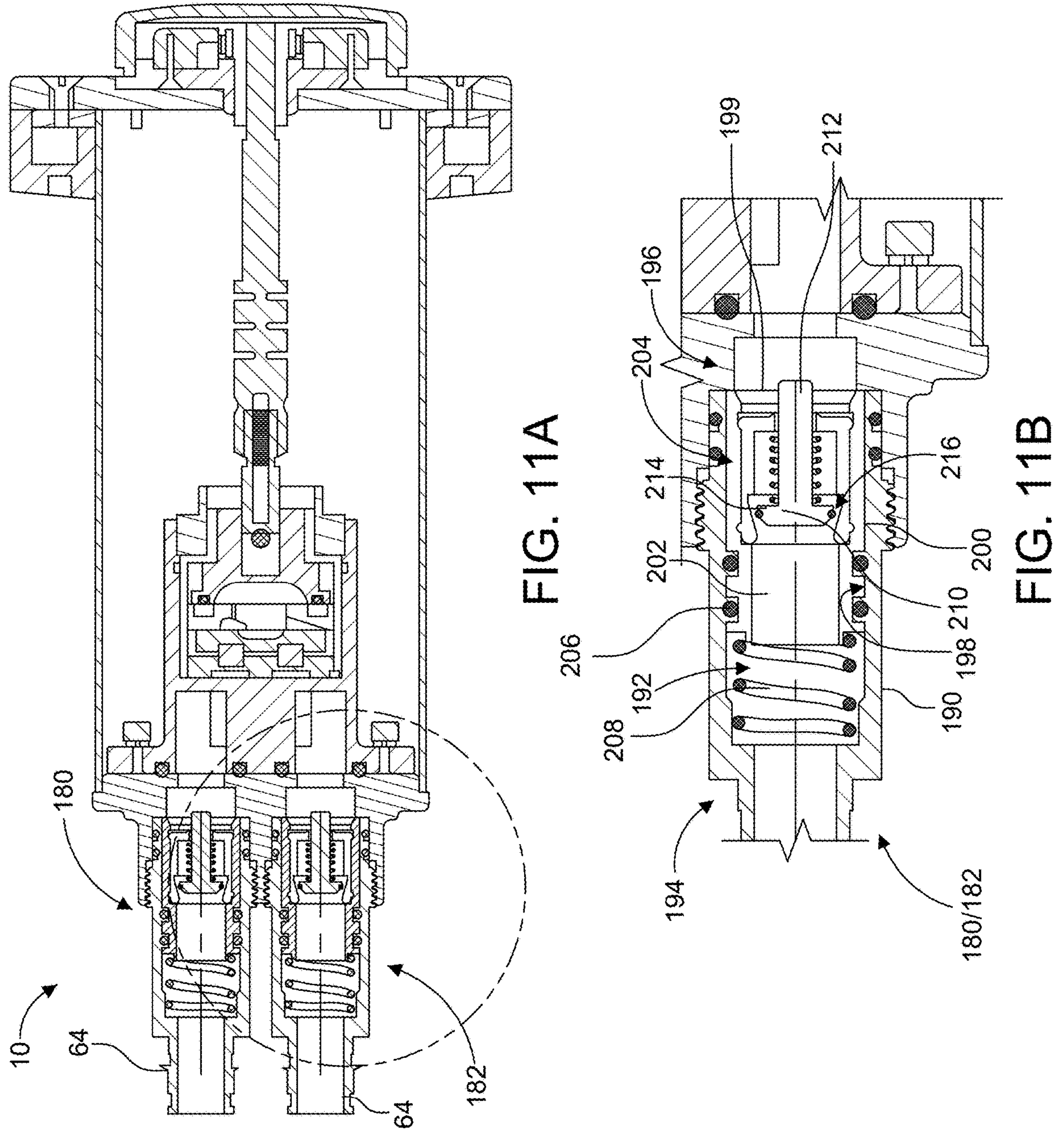
FIG. 11A is a plan view, with portions broken away, of the fluid valve of FIG. 10 and of the hot-fluid and cold-fluid unidirectional-valve assemblies of FIGS. 8-9B after the valve-opening-and-fluid-dispensing device breaks the cavity seal while the fluid valve is open, according to an embodiment.
FIG. 11B is a magnified view of one of the unidirectional-valve assemblies of FIG. 11A, according to an embodiment.

FIG. 11A is a plan view, with portions broken away, of the variable-temperature fluid valve 10 of FIG. 10 including unidirectional-valve assemblies 180 (e.g., for the hot-fluid inlet) and 182 (e.g., for the cold-fluid inlet) as they are after the valve-opening-and-fluid-dispensing device 16 causes the seal between the cavity wall 148 and the seal 98 (FIG. 10) to break such that the variable-temperature fluid valve and the unidirectional-valve assemblies are open (e.g., are in open states), according to an embodiment.

FIG. 11B is a magnified view of one of the unidirectional-valve assemblies 180 and 182 of FIG. 11A, according to an embodiment.

Referring to FIGS. 9A-9B and 11A-11B, each unidirectional-valve assembly 180 and 182 includes a sleeve 190 defining a channel 192 having an inlet end 194 and an outlet end 196, an inner surface 198, and a "lip" 199.

Each unidirectional-valve assembly 180 and 182 also includes a body 200 slidably disposed within the channel 192 and defining a cavity 202 within which is disposed a unidirectional valve (e.g., check valve) 204. Disposed around the body 200 are one or more seals (e.g., one or more O-rings) 206, which each form a fluid-tight seal with the inner surface 198 of the channel 192. The body 200 also is configured to engage the lip 199 such that the lip retains the body within the channel 192.

A spring 208 is disposed within the channel 192 at the inlet end 194 and is configured to urge the body 200 toward the outlet end 196 of the channel.

The unidirectional valve 204 includes a poppet 210 having a stem 212 and one or more seals (e.g., one or more O-rings) 214 disposed around the poppet, and includes a return spring 215 configured to urge the poppet toward the inlet end 194 of the channel 192.

Referring to FIGS. 8-11B, operation of the unidirectional-valve assemblies 180 and 182 (referred to as 180/182 in FIGS. 9B and 11B) are described according to an embodiment.

Referring to FIGS. 8 and 11A-11B, while the valve-opening-and-dispensing device 16 is uninstalled, or is only partially installed, the piston 96 is positioned so that the seal 98 is inside of the cavity 126 and forms a fluid-tight seal with the inner wall 148 of the cavity. Consequently, no fluid flows into or through the cavity 126.

The unidirectional-valve assembly 180/182 is in an inactive state, meaning that the combination of the forces of the spring 208 and water pressure from the water-supply-and-distribution system (via the hot-fluid and cold-fluid inlets 64) urges the body 200 all the way to, and against, the lip at the outlet end 196 of the channel 192 (the lip prevents the forces of the spring and water pressure from forcing the body out from the channel via the outlet end). And because there is no fluid flowing through the cavity 126 of the variable-temperature fluid valve 10, and because the spring 215 urges the poppet 210 toward the inlet end 194 of the channel 192, the unidirectional valve 204 is closed due to the seal 214 forming a fluid-tight seal with an inner wall 216 of the unidirectional valve (the unidirectional valve 204 is shown as being open in FIGS. 11A and 11B, but in the inactive state the unidirectional valve 204 is typically closed).

Next, referring to FIGS. 8-9B, during installation of the valve-opening-and-dispensing device 16, the piston 96 starts moving toward a rear end 218 of the cavity 126 (leftward in FIG. 10), and this movement generates a backpressure in the region 170 of the variable-temperature fluid valve 10 (the region 170 is a region between the rear end of the cavity and the output port of the mixer 102). As this piston-out-from-cavity movement continues, at some time during this movement the seal 98 exits the cavity 126, thus breaking the fluid-tight seal between the seal and the cavity wall 148, per FIG. 10.

Referring to FIGS. 9A and 9B, while the piston 96 is moving out of the cavity, and for a relatively short period of time (e.g., a fraction of a second) after the fluid-tight seal between the seal 98 and the cavity wall 148 breaks, a back pressure is generated in the region 170 as described in the preceding paragraph, and, via the output port and input ports of the mixer 102, this back pressure propagates to the unidirectional-valve assemblies 180 and 182. The force that this propagating back pressure generates on the body 200 at the outlet end 196 of the channel 192 is, at least temporarily, greater than the combined force that the water-supply-and-distribution-system water pressure and the spring 208 generate on the body at the inlet end 194 of the channel. Consequently, this force differential (caused by the aforementioned pressure differential) not only closes the unidirectional valve 204 (by urging the poppet 210 toward the inlet end 194 of the channel 192 and causing the seal 214 to form a fluid-tight seal with the inner wall 216 of the unidirectional valve), but also urges the body 200 away from the outlet end 196 of the channel 192 toward the inlet end 194 of the channel, thus compressing the spring 208; that is, this force differential causes the body 200 to slide toward the inlet end of the channel a distance x, which sliding relieves the back pressure in the region 170 of the variable-temperature fluid valve 10 sufficiently to reduce, or to eliminate, the impediment that the back pressure otherwise may cause during insertion of the valve-opening-and-fluid-dispensing device 16 into the receptacle 20. For example, the distancex may be in an approximate range of 0.5-10 millimeters (mm).

Referring to FIGS. 10-11B, after the elapse of the relatively short period of time (e.g., a fraction of one second) after the breaking of the fluid-tight seal between the seal 98 and the cavity inner wall 148, because the variable-temperature fluid valve is open per FIG. 10 (e.g., the seal 98 is out from the cavity 126), the fluid pressure (force) (along with the force of the spring 208) on the body 200 at the inlet end 194 of the channel 192 exceeds the pressure on the body at the outlet end 196 of the channel, and this pressure (force) differential causes the body to slide toward the outlet end of the channel and toward and against the lip 199 of the channel.

Furthermore, this pressure (force) differential opens the unidirectional valve 204 by forcing the poppet 210 toward the outlet end 196 of the channel 192 and, therefore, by breaking the fluid-tight seal between the seal 214 and the inner surface 216.

Still referring to FIGS. 10-11B, after the unidirectional valve 204 opens, fluid is free to flow, and does flow, from the water-supply-and-distribution system, through the hot-fluid and cold-fluid inlets 64, into the input ports of the mixer 102, out from the output port of the mixer and into the region 170, into and through the cavity 126, and out from the valve-opening-and-fluid-dispensing device 16 via the receptacle 20.

Still referring to FIGS. 8-11B, in response to one removing the valve-opening-and-fluid-dispensing device 16 from the receptacle 20 of the variable-temperature fluid valve 10, the combined forces of the water pressure in the region 170 from the water-supply-and-distribution system and the piston-return spring 100 closes the variable-temperature fluid valve by urging the piston 96 back into the cavity 126 such that the seal 98 reestablishes a fluid-tight seal with the inner wall 148 of the cavity. And the unidirectional-valve assemblies 180 and 182 enter a resting state similar to the state shown in FIGS. 11A-11B but with the seal ring 214 forming a fluid-tight seal with the surface 216 such that the unidirectional valve 204 is closed.

Still referring to FIGS. 8-11B, alternate embodiments are contemplated. For example, instead of the seal 98 forming a fluid-tight seal with the inner surface 148 of the cavity 126, the seal 98 may form a fluid-tight seal with the rear end (e.g., edge) 218 of the cavity. Furthermore, the fluid-valve 10 may be a uni-temperature valve having only one inlet 64 and one unidirectional-valve assembly 180/182, and omitting the mixer 102. Moreover, instead of being installed between an inlet 64 and the mixer 102, one or more unidirectional-valve assemblies each can be installed between and inlet 64 and the fluid-supply-and-distribution system of a structure in which the fluid valve 10 is installed.

FIGS. 12-16 are views of a unidirectional-valve assembly 300, which is similar to the unidirectional valves 180 and 182 of FIGS. 9A-9B and 11A-11B, according to an embodiment. Operation of the unidirectional-valve assembly 300, according to an embodiment, is described below in conjunction with FIGS. 5, 8, 10, and 12-16.

Figure 12:
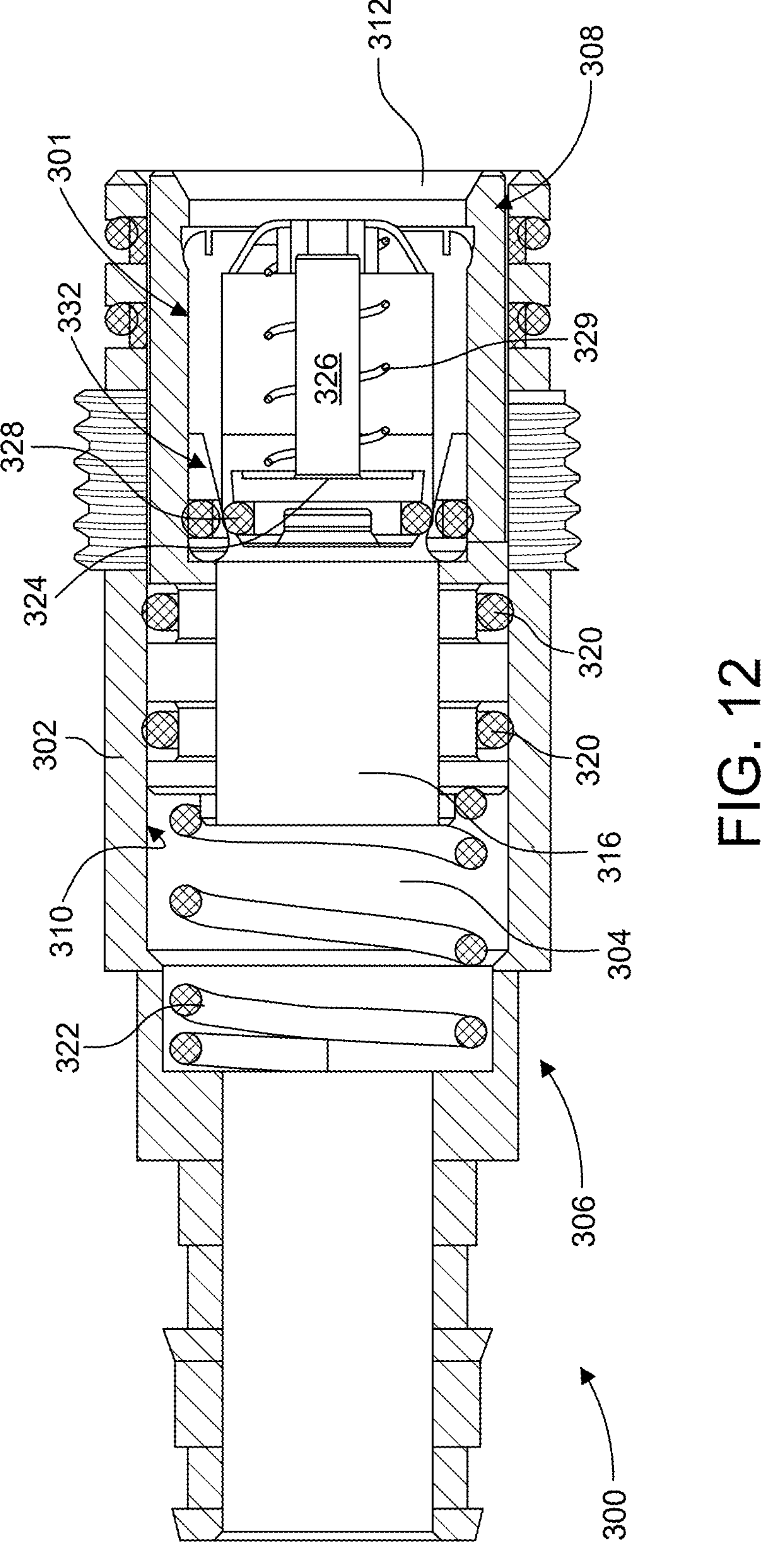
FIG. 12 is a side view, with portions broken away, of a unidirectional-valve assembly that is similar to the unidirectional-valve assemblies of FIGS. 8-11B while in a "resting" state (while the fluid-valve is closed) and before the valve-opening-and-fluid-dispensing device breaks the cavity seal, according to an embodiment.

FIG. 12 is a side view, with portions broken away, of the unidirectional-valve assembly 300 in a resting state, e.g., before the valve-opening-and-fluid-dispensing device 16 is inserted into the receptacle 20 of the variable-temperature fluid valve 10, according to an embodiment.

Figure 13:
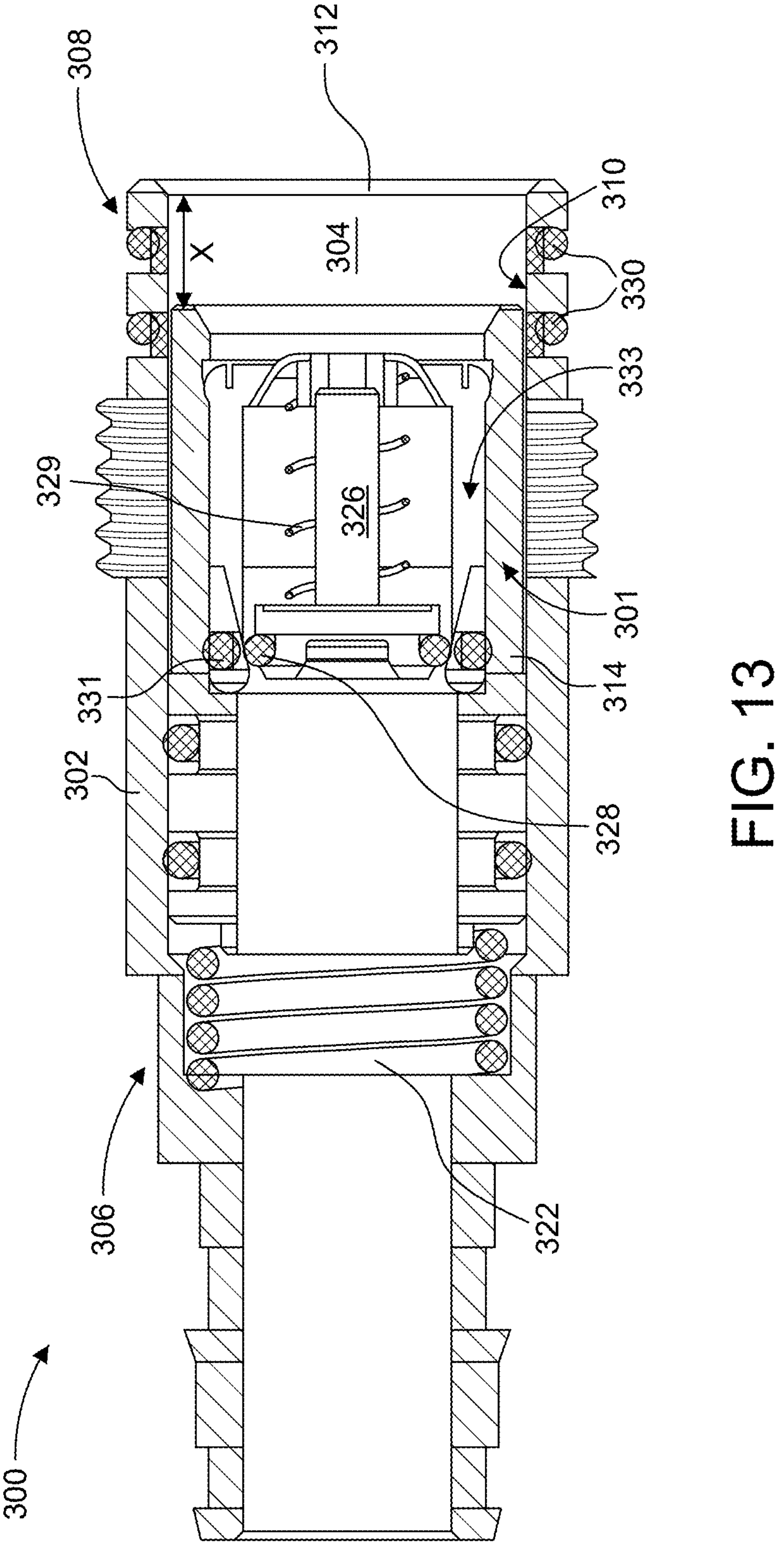
FIG. 13 is a side view, with portions broken away, of the unidirectional-valve assembly of FIG. 12 while the valve-opening-and-fluid-dispensing device is being inserted into the receptacle of the fluid valve and the cavity seal is intact (e.g., unbroken) and just (e.g., a fraction of a second) after the valve-opening-and-fluid-dispensing device breaks the cavity seal, according to an embodiment.

FIG. 13 is a side view, with portions broken away, of the unidirectional-valve assembly 300 of FIG. 12 while the valve-opening-and-fluid-dispensing device 16 is being inserted into the receptacle 20 of the variable-temperature fluid valve 10 to just (e.g., a fraction of a second) after the valve-opening-and-fluid-dispensing device breaks the cavity seal between the cavity wall 148 and the seal 98 (e.g., FIG. 10), according to an embodiment.

Figure 14:
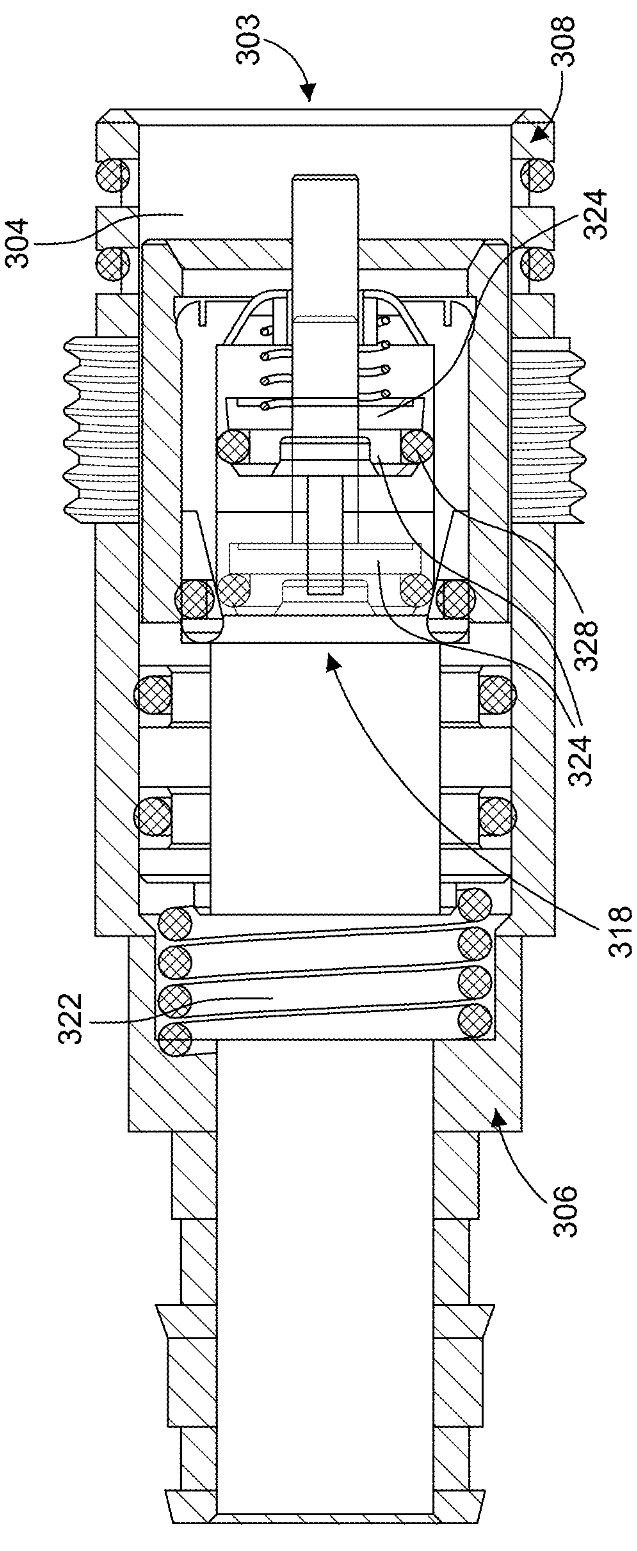
FIG. 14 is a side view, with portions broken away, of the unidirectional-valve assembly of FIGS. 12-13 just after the fluid valve, and the unidirectional valve of the unidirectional-valve assembly, open, according to an embodiment.

FIG. 14 is a side view, with portions broken away, of the unidirectional-valve assembly 300 of FIGS. 12-13 just (e.g., a fraction of a second to a few seconds) after the state of the unidirectional-valve assembly in FIG. 13 when a unidirectional valve 301 of the unidirectional-valve assembly opens, according to an embodiment.

Figure 15:
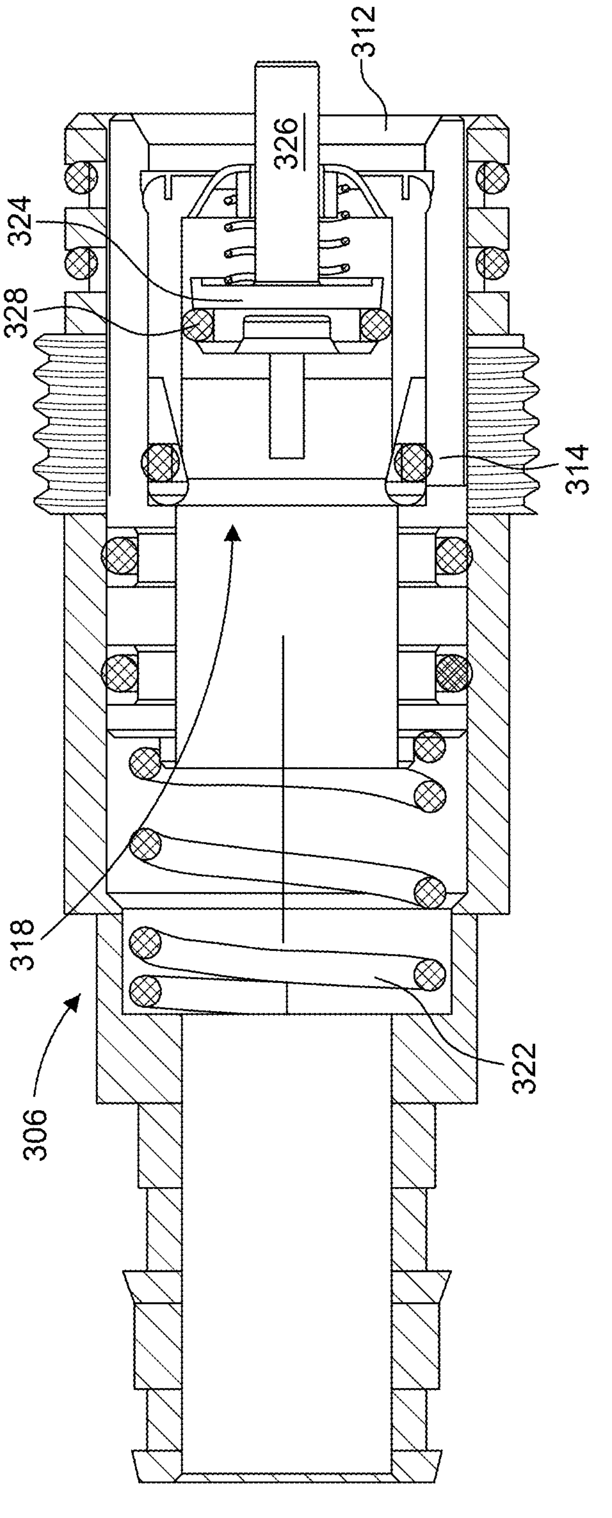
FIG. 15 is a side view, with portions broken away, of the unidirectional-valve assembly of FIGS. 12-14 longer (as compared to FIG. 14) after the unidirectional valve of the unidirectional-valve assembly opens (e.g., in a reset mode), according to an embodiment.

FIG. 15 is a side view, with portions broken away, of the unidirectional-valve assembly 300 of FIGS. 12-14 a longer time (as compared to FIG. 14) after the unidirectional valve 301 of the unidirectional-valve assembly opens when the unidirectional-valve assembly is reset, according to an embodiment.

Figure 16:
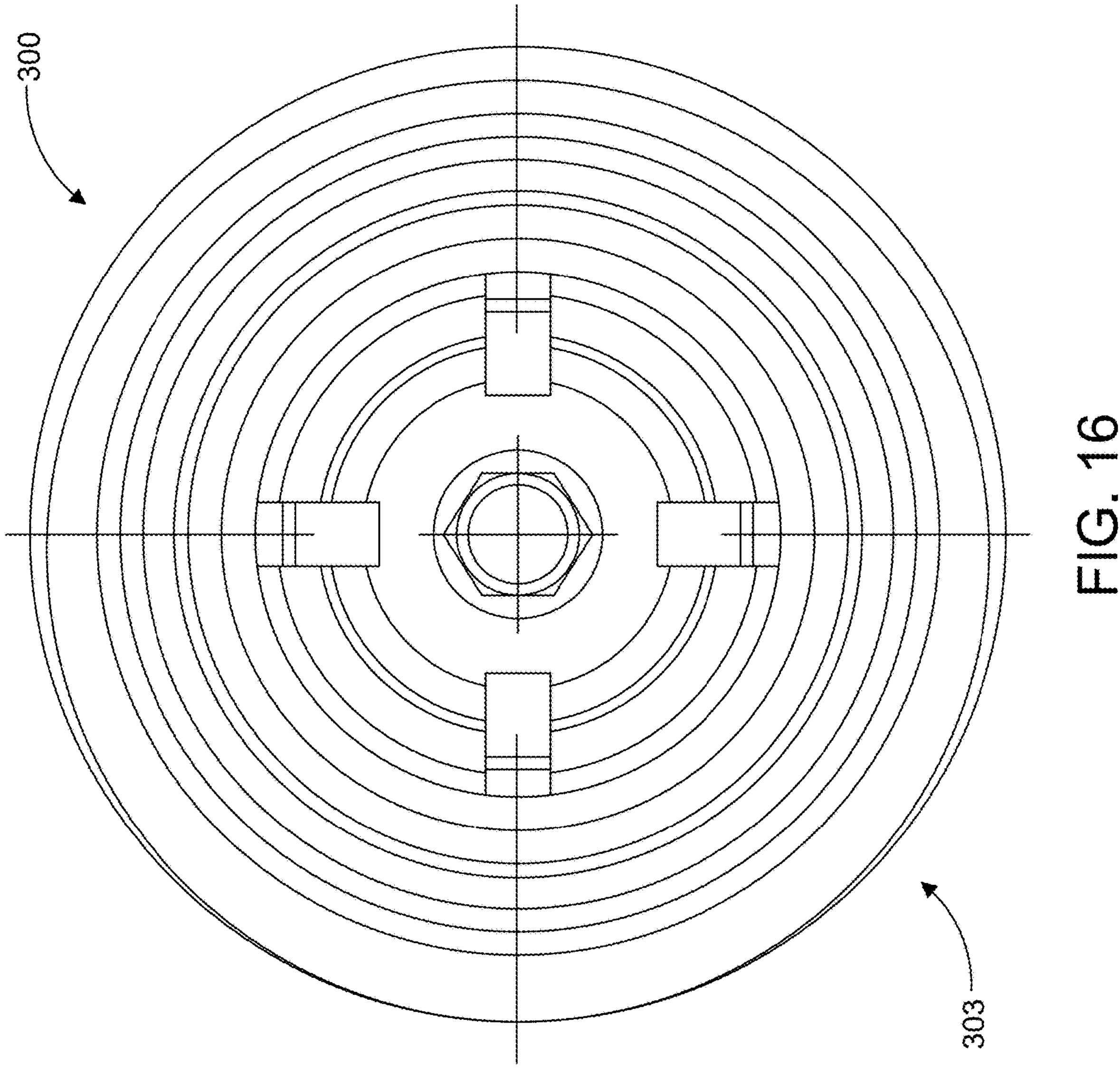
FIG. 16 is an inner-end (e.g., fluid-valve-facing-end) view of the unidirectional-valve assembly of FIGS. 12-15, according to an embodiment.

FIG. 16 is view of an inlet end 303 of the unidirectional-valve assembly 300 of FIGS. 12-15, according to an embodiment.

Referring to FIGS. 12-16, the unidirectional-valve assembly 300 includes a sleeve 302 defining a channel 304 having an inlet end 306 and an outlet end 308, an inner surface 310, and a "lip" 312.

The unidirectional-valve assembly 300 also includes a body 314 slidably disposed within the channel 304 and defining a cavity 316, and the unidirectional valve (e.g., check valve) 301 disposed within the cavity. Around the body 314 are one or more seals (e.g., one or more O-rings) 320, which each form a fluid-tight seal with the inner surface 310 of the channel 304. The body 314 is configured to engage the lip 312 such that the lip retains the body within the channel 304.

And the unidirectional-valve assembly 300 includes a spring 322 disposed within the channel 304 and configured to urge the body 314 toward the outlet end 308 of the channel and against the lip 312 (the lip prevents the spring from urging the body out of the outlet end of the channel).

The unidirectional valve 301 includes a poppet 324 having a stem 326, one or more seals (e.g., one or more O-rings) 328 disposed around the poppet, and a return spring 329 disposed around the stem.

And the sleeve 302 can include one or more seals (e.g., O-rings) 330 disposed around it to form a fluid-tight seal with an opening in which the sleeve is installed (see, e.g., FIGS. 9A-9B and 11A-11B), and the unidirectional valve 301 can include one or more seals (e.g., O-rings) 331 disposed around it to form a seal with an inner wall 333 of the cavity 316.

Referring to FIGS. 8, 10, and 12-16, operation of the unidirectional-valve assembly 300 is described according to an embodiment in which one or both of the unidirectional valves 180 and 182 of FIGS. 8-11B are replaced with a unidirectional valve 300.

Referring to FIGS. 8 and 12, while the valve-opening-and-dispensing device 16 is uninstalled, or is only partially installed, the piston 96 is positioned so that the seal 98 is inside of the cavity 126 and forms a fluid-tight seal with the inner wall 148 of the cavity. Consequently, no fluid flows into or through the cavity 126.

The unidirectional-valve assembly 300 is in a closed (e.g., resting) state, meaning that the combination of the forces of the spring 322 and water pressure from the water-supply-and-distribution system (via the hot-fluid and cold-fluid inlets 64) urges the body 314 all the way to, and against, the lip 312 at the outlet end 308 of the channel 304 (the lip prevents the forces of the spring and water pressure from forcing the body out from the channel). And because there is no fluid flowing through the cavity 126 of the variable-temperature fluid valve 10, the unidirectional valve 318 is closed because the spring 329 urges the poppet 324 toward the outlet end 306 of the channel 304 such that the seal 328 forms a fluid-tight seal with an inner surface 332 of the unidirectional valve.

Next, referring to FIGS. 8 and 10, during installation of the valve-opening-and-fluid-dispensing device 16 into the receptacle 20, the piston 96 moves toward the end 218 of, and eventually out from, the cavity 126 (leftward in FIG. 10), and this movement generates a backpressure in the region 170 of the variable-temperature fluid valve 10 (the region 170 is a region between the rear end 218 of the cavity and the output port of the mixer 102). As this piston-toward-end-and-out-from-cavity movement continues, at some time during this movement the seal 98 exits the cavity 126, thus breaking the fluid-tight seal between the seal 98 and the cavity wall 148, per FIG. 10.

Referring to FIGS. 8, 10, and 13, while the piston 96 is moving toward the end 218 of the cavity 126, and for a relatively short period of time (e.g., a fraction of a second) after the fluid-tight seal between the seal 98 and the cavity wall 148 breaks, a back pressure is generated in the region 170, and, via the output port and input ports of the mixer 102, this back pressure propagates to the unidirectional valve(s) 300. The force that this propagating back pressure generates on the body 314 at the outlet end 308 of the channel 304 is, at least temporarily, greater than the combined force that the water-supply-and-distribution-system water pressure and the spring 322 generates on the body at the inlet end 306 of the channel. Consequently, this force differential (caused by the aforementioned pressure differential) not only closes the unidirectional valve 318 (by urging the poppet 324 toward the inlet end 306 of the channel 304 and causing the seal 328 to form a fluid-tight seal with the inner wall 332 of the unidirectional valve), but also urges the body 314 away from the outlet end 308 of the channel 304 toward the inlet end 306 of the channel, thus compressing the spring 322; that is, this force differential causes the body 314 to slide toward the inlet end 306 of the channel 304 a distance x, which sliding relieves the back pressure in the region 170 of the fluid valve 10 sufficiently to reduce, or to eliminate, the impediment that the back pressure otherwise may cause to one installing the valve-opening-and-fluid-dispensing device 16 in the receptacle 20.

Referring to FIG. 14, After the elapse of a relatively short period of time (e.g., a fraction of a second) after the breaking of the fluid-tight seal between the seal 98 and the cavity inner wall 148, because the fluid valve 10 is open per FIG. 10 (e.g., the seal 98 is out from the cavity 126), the fluid pressure (force) (along with the force of the spring 322) on the body 314 at the inlet end 306 of the channel 304 exceeds the pressure at the outlet end 308 of the channel, and this pressure (force) differential opens the unidirectional valve 318 by forcing the poppet 324 toward the outlet end 308 of the channel 304 and, therefore, breaking the fluid-tight seal between the seal 328 and the inner surface 332.

Referring to FIGS. 10 and 15, after the unidirectional valve 318 opens, fluid is free to flow, and does flow, from the water-supply-and-distribution system, through one or both of the hot-fluid and cold-fluid inlets 64, through the unidirectional valve(s) 300, into the input ports of the mixer 102, out from the output port of the mixer and into the region 170, into and through the cavity 126, and out from the valve-opening-and-fluid-dispensing device 16 via the receptacle 20.

Furthermore, while the variable-temperature fluid valve 10 and unidirectional valve 318 remain open, the fluid pressure (force) (along with the force of the spring 322) on the body 314 at the inlet end 306 of the channel 304 continues to exceed the pressure at the outlet end 308 of the channel, and this pressure (force) differential causes the body to slide toward, and eventually against, the lip 312 of the channel. The unidirectional valve 318, and thus the fluid-valve assembly 300, remain in the open state for as long as the variable-temperature fluid valve 10 remains open.

Referring to FIGS. 8 and 12, in response to one removing the valve-opening-and-fluid-dispensing device 16 from the receptacle 20, the combined force of the water pressure in the region 170 from the water-supply-and-distribution system and the rod spring 100 closes the variable-temperature fluid valve 10 by urging the piston 96 back into the cavity 126 such that the seal 98 reestablishes a fluid-tight seal with the inner wall 148 of the cavity. In response to the reestablishment of the fluid-tight seal between the seal 98 and the inner wall 148 of the cavity 126, the unidirectional-valve assembly 300 enters the closed, e.g., rest, state as shown in FIG. 12.

Referring to FIGS. 12-16, alternate embodiments are contemplated. For example, embodiments and alternate embodiments described elsewhere herein may be applicable to the unidirectional-valve assembly 300.

Figure 17:
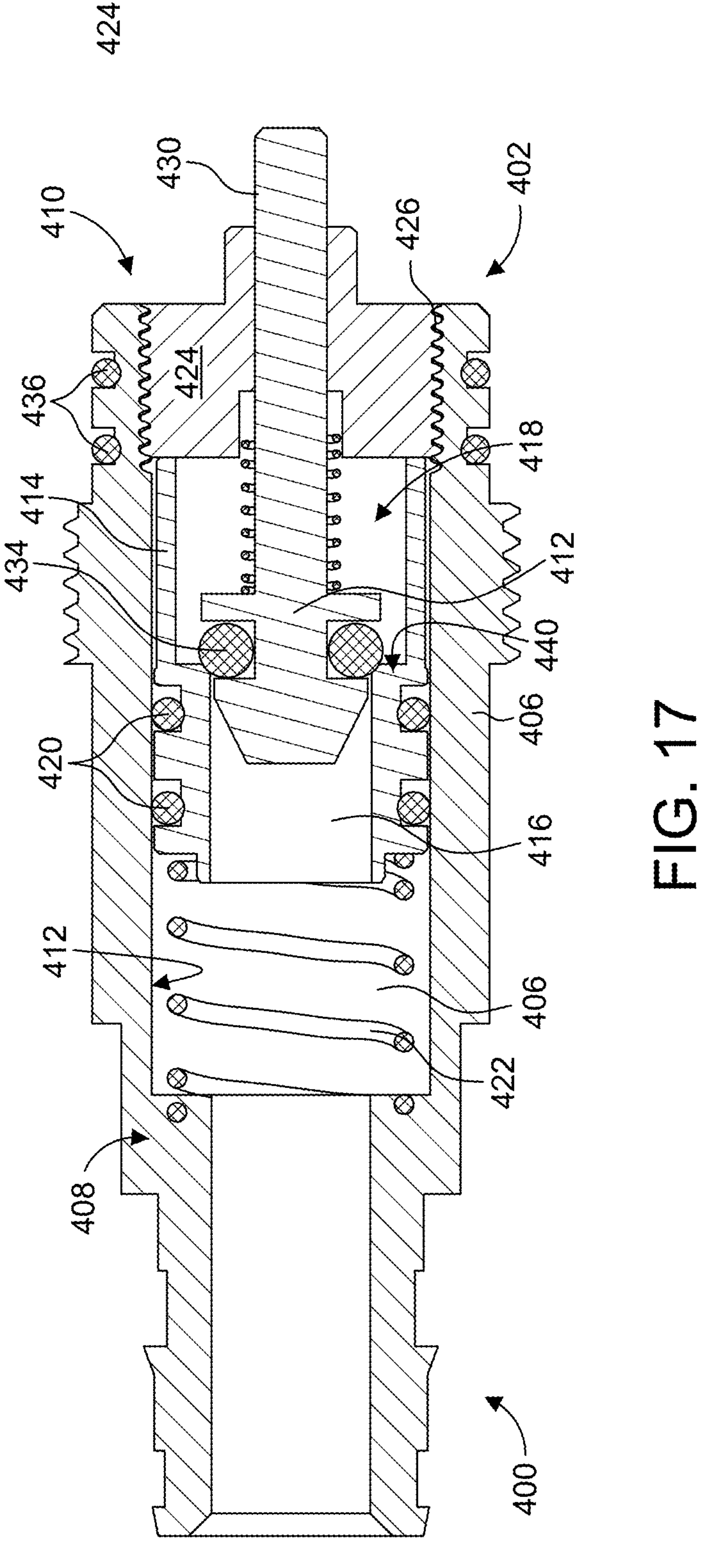
FIG. 17 is a side view, with portions broken away, of a unidirectional-valve assembly that is similar to the unidirectional-valve assemblies of FIGS. 9A-9B, 11A-11B, and 12-16 while in a "resting" state (e.g., while the fluid-valve is closed and the cavity seal is intact), according to an embodiment.

FIG. 17 is a side view, with portions broken away, of a unidirectional-valve assembly 400, which is similar to the unidirectional-valve assemblies 180 and 182 and 300 of FIGS. 9A-9B and 12-16, according to an embodiment. Where one or both of the unidirectional-valve assemblies 180 and 182 of FIGS. 8 and 10 are each replaced with a unidirectional-valve assembly 400, FIG. 17 shows the state of the unidirectional-valve assembly(ies) 400 before one inserts the valve-opening-and-fluid-dispensing device 16 into the receptacle 20 of the variable-temperature fluid valve 10 (FIGS. 5, 8, and 10), according to an embodiment.

Figure 18:
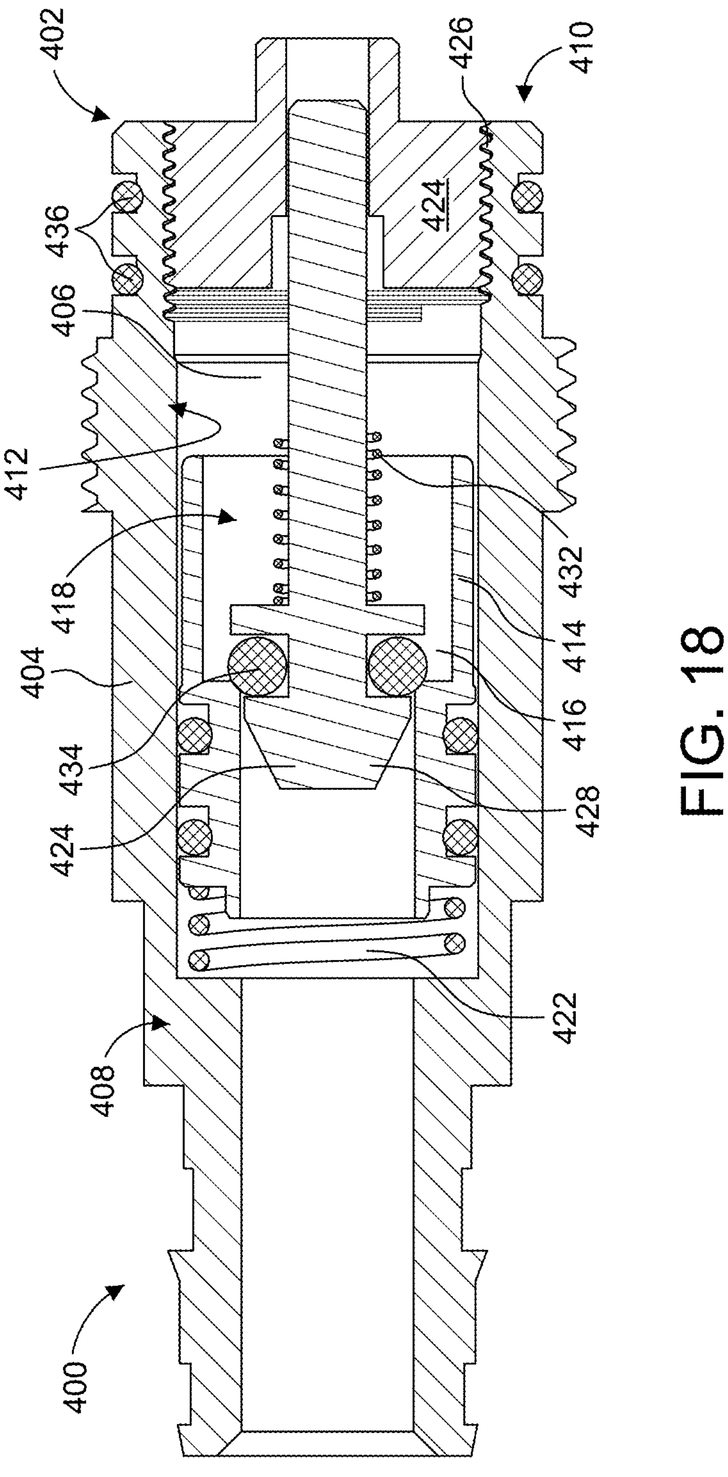
FIG. 18 is a side view, with portions broken away, of the unidirectional-valve assembly of FIG. 17 while the valve-opening-and-fluid-dispensing device is being inserted into the receptacle of the fluid valve and the cavity seal is intact and just (e.g., a fraction of a second) after the valve-opening-and-fluid-dispensing device breaks the cavity seal, according to an embodiment.

FIG. 18 is a side view, with portions broken away, of the unidirectional-valve assembly 400 of FIG. 17, according to an embodiment. Where one or both of the unidirectional-valve assemblies 180 and 182 of FIGS. 8 and 10 are each replaced with a unidirectional-valve assembly 400, FIG. 18 shows the state of the unidirectional-valve assembly(ies) 400 at a point in time while one is inserting the valve-opening-and-fluid-dispensing device 16 into the receptacle 20 of the variable-temperature fluid valve 10 (FIGS. 5, 8, and 10) (e.g., before, or at the time that, the device 16 breaks the fluid-tight seal formed by the seal 98 and the inner cavity wall 148) or just (e.g., a fraction of a second) after the valve-opening-and-fluid-dispensing device breaks the fluid-tight seal formed by the seal 98 and inner cavity wall 148, according to an embodiment.

Figure 19:
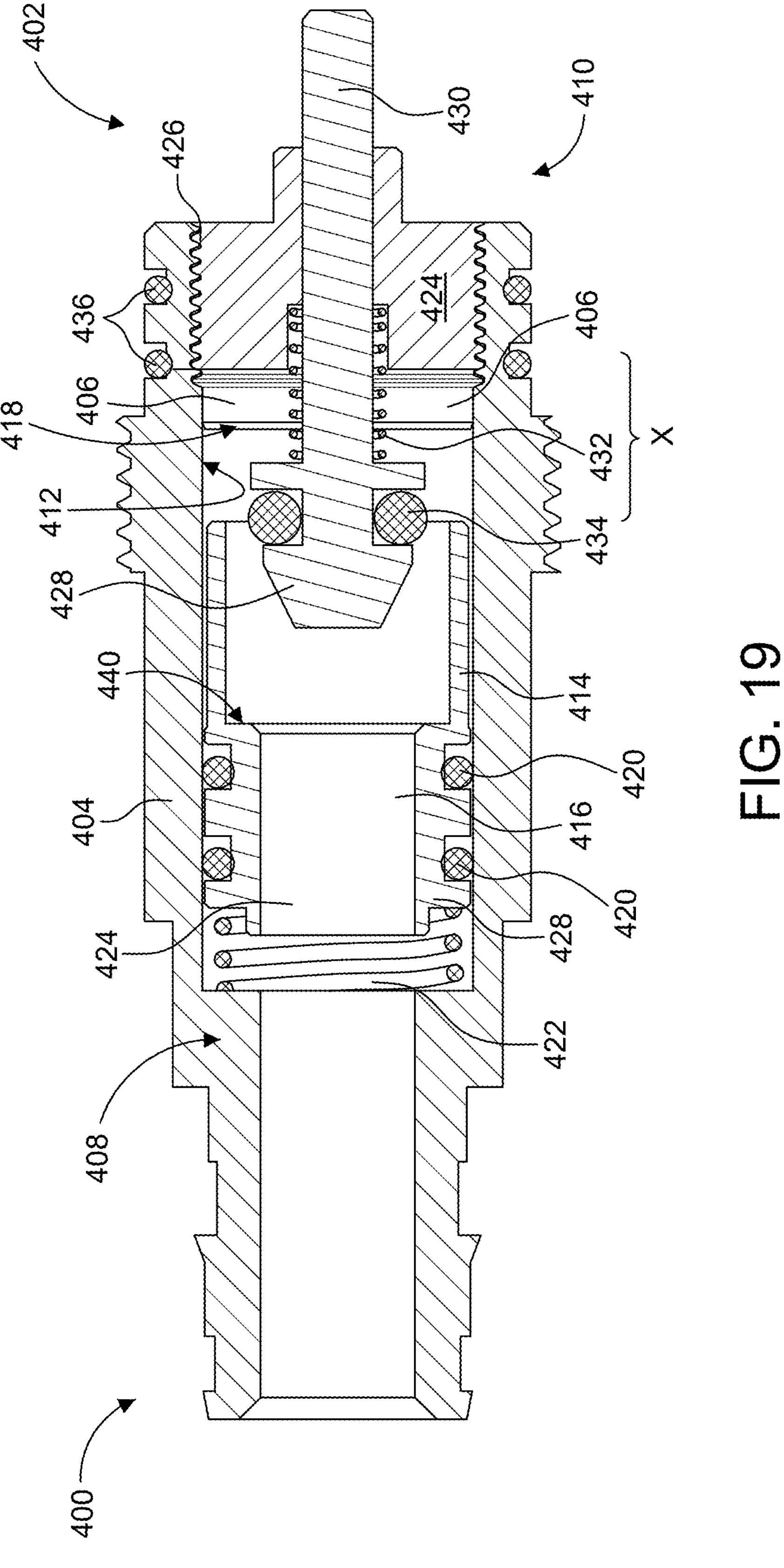
FIG. 19 is a side view, with portions broken away, of the unidirectional-valve assembly of FIGS. 17-18 while the fluid valve and the unidirectional-valve assembly are open just (e.g., a fraction of a second) after the valve-opening-and-fluid-dispensing device breaks the cavity seal but before the unidirectional-valve assembly is reset, according to an embodiment.

FIG. 19 is a side view, with portions broken away, of the unidirectional-valve assembly 400 of FIG. 17, according to an embodiment. Where one or both of the unidirectional-valve assemblies 180 and 182 of FIGS. 8 and 10 are each replaced with a unidirectional-valve assembly 400, FIG. 19 shows the state (unidirectional valve 418 open) of the unidirectional-valve assembly(ies) 400 at a point in time just (e.g., a fraction of a second) after the valve-opening-and-fluid-dispensing device 16 breaks the fluid-tight seal formed by the seal 98 and inner cavity wall 148 (see FIG. 10), according to an embodiment.

Figure 20:
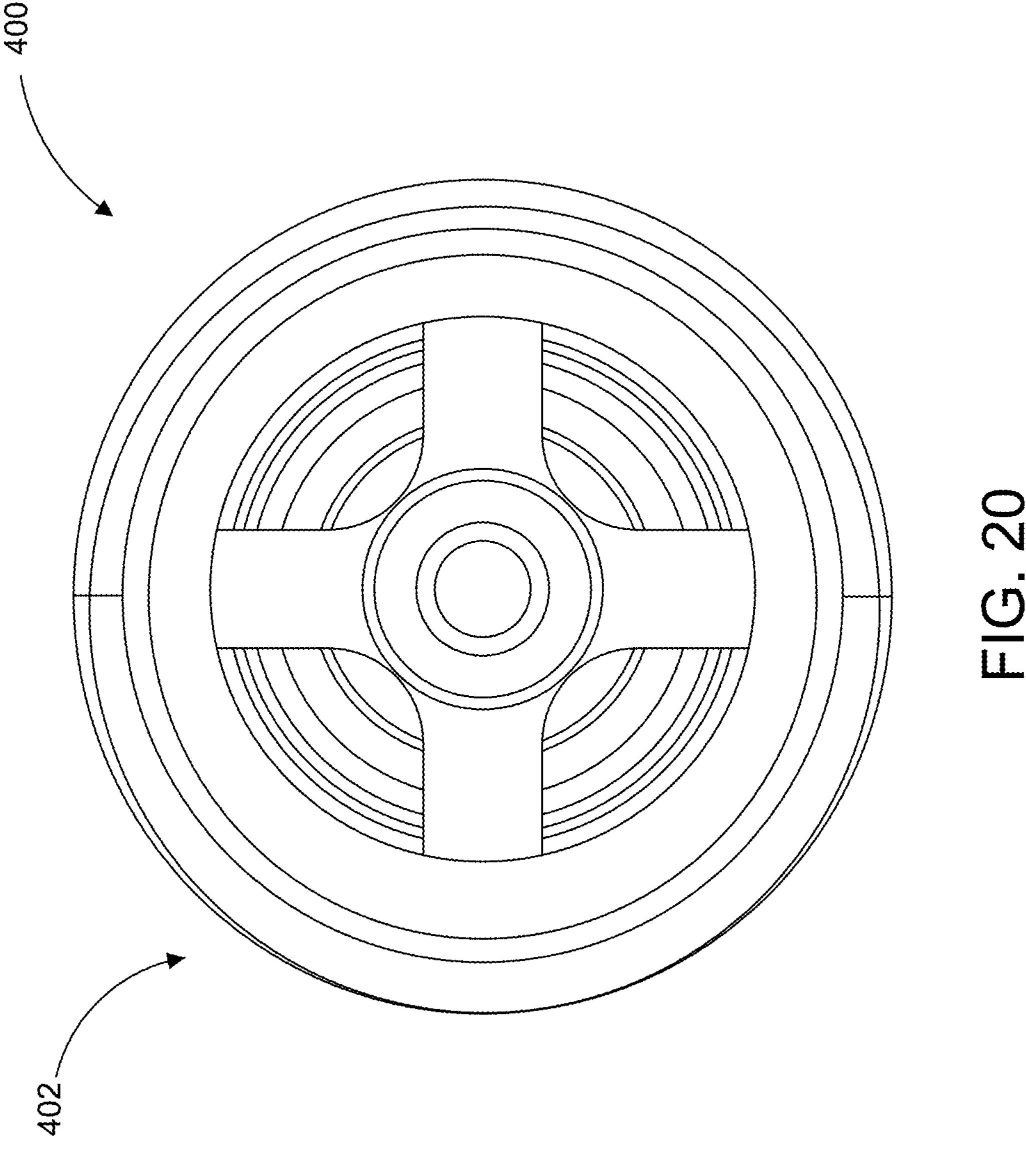
FIG. 20 is an inner-end (e.g., fluid-valve-facing end) view of the unidirectional-valve assembly of FIGS. 17-19, according to an embodiment.

FIG. 20 is a view of an outlet-end 402 of the unidirectional-valve assembly 400 of FIGS. 17-19, according to an embodiment.

Referring to FIGS. 17-20, the unidirectional-valve assembly 400 includes a sleeve 404 defining a channel 406 having an inlet end 408, an outlet end 410, and an inner surface 412.

The unidirectional-valve assembly 400 also includes a body 414 slidably disposed within the channel 406 and defining a cavity 416 within which is disposed a unidirectional valve (e.g., check valve) 418. Around the body 414 are one or more seals (e.g., one or more O-rings) 420, which are each configured to form a fluid-tight seal with the inner surface 412 of the channel 406.

The universal-valve assembly 400 further includes a spring 422 disposed within the channel 406 and configured to urge the body 414 toward the outlet end 410 of the channel.

In addition, the unidirectional-valve assembly 400 includes a retainer 424 configured to stop the spring 422 and water pressure (e.g., from the water-supply-and-distribution system (not visible in FIGS. 17-19) in which the variable-temperature fluid valve 10 is installed) from forcing the body 414 out of the outlet end 410 of the channel 406. The retainer 424 may be secured to, or within, the sleeve 404 with threads 426.

The unidirectional valve 418 includes a poppet 428 having a stem 430, a spring 432, and one or more seals (e.g., one or more O-rings) 434 disposed around the poppet.

And the sleeve 404 can include one or more seals (e.g., O-rings) 436 disposed around it to form a fluid-tight seal with an opening in which the sleeve is installed (see, e.g., FIGS. 9A-9B and 11A-11B).

Referring to FIGS. 8, 10, and 17-20, operation of the unidirectional-valve assembly 400 is described according to an embodiment in which one or both of the unidirectional valves 180 and 182 of FIGS. 8-11B are replaced with a respective unidirectional-valve assembly 400.

Referring to FIGS. 8 and 17, while the valve-opening-and-dispensing device 16 is uninstalled in the receptacle 20 of the variable-temperature fluid valve 10, the piston 96 is positioned so that the seal 98 is inside of the cavity 126 and forms a fluid-tight seal with the inner wall 148 of the cavity. Consequently, no fluid flows into or through the cavity 126.

The unidirectional-valve assembly 400, therefore, is closed (e.g., in a closed or an inactive state), meaning that the combination of the forces of the spring 422 and water pressure from the water-supply-and-distribution system (via the hot-fluid and cold-fluid inlets 64) urges the body 414 all the way to, and against, the retainer 424 at the outlet end 410 of the channel 406 (the retainer prevents the forces of the spring and water pressure from forcing the body out from the channel). And because there is no fluid flowing through the cavity 126 of the variable-temperature fluid valve 10, the unidirectional valve 418 is closed (e.g., in a closed or an inactive state) because the spring 432 forces the seal 434 against an inner wall (e.g., edge) 440 of the cavity 418, as shown in FIG. 17, such that the seal 434 and the inner wall 440 form a fluid-tight seal.

Next, referring to FIGS. 8 and 10, during installation of the valve-opening-and-dispensing device 16, the piston 96 moves toward the rear end 218 of, and eventually out from, the cavity 126 (leftward in FIGS. 8 and 10), and this movement generates a backpressure in the region 170 of the variable-temperature fluid valve 10. As this piston-toward-the-rear-end-of-and-out-from-cavity movement continues, at some point during this movement the seal 98 exits the cavity 126, thus breaking the fluid-tight seal formed by the seal 98 and the cavity wall 148, per FIG. 10.

Referring to FIGS. 8, 10, and 18, while the piston 96 is moving toward the read end 218 of the cavity 126, and for a relatively short period of time (e.g., a fraction of a second) after the piston and seal 98 move out from the cavity such that the fluid-tight seal between the seal 98 and the cavity wall 148 breaks, a back pressure is generated in the region 170, and, via the output port and input ports of the mixer 102, this back pressure propagates to the unidirectional valve(s) 400. This force that this propagating back pressure generates on the body 414 at the outlet end 410 of the channel 406 is, at least temporarily, greater than the combined force that the water-supply-and-distribution-system water pressure and the spring 422 generates on the body at the inlet end 408 of the channel. Consequently, this force differential (caused by the aforementioned pressure differential) not only closes the unidirectional valve 418 (by urging the poppet 428 toward the inlet end 408 of the channel 406 and causing the seal 434 to form a fluid-tight seal with the inner edge 440 of the unidirectional valve), but this force differential also urges the body 414 away from the outlet end 410 of the channel 406 toward the inlet end 408 of the channel, thus compressing the spring 422; that is, this force differential causes the body 414 to slide toward the inlet end 410 of the channel 406 a distance x, which sliding relieves the back pressure in the region 170 of the variable-temperature fluid valve 10 sufficiently to reduce, or to eliminate, the impediment that the back pressure otherwise may present to one installing the valve-opening-and-fluid-dispensing device 16 in the receptacle 20.

Furthermore, referring to FIGS. 10 and 19, this pressure (force) differential opens the unidirectional valve 418 by forcing the poppet 428 toward the outlet end 410 of the channel 406 (the water pressure overcomes the force of the spring 432), thus breaking the fluid-tight seal formed by the seal 434 and an inner edge 440 of the cavity 416 of the unidirectional valve.

And referring to FIGS. 10 and 17, after the elapse of the relatively short period (e.g., a fraction of a second) of time after the breaking of the fluid-tight seal between the seal 98 and the cavity inner wall 148 and the breaking of the fluid-tight seal between the seal 434 and the inner edge 440 of the cavity 416, because the variable-temperature fluid valve 10 is open per FIG. 10 (e.g., the seal 98 is out from the cavity 126), the fluid pressure (force) (along with the force of the spring 422) on the body 414 at the inlet end 408 of the channel 406 exceeds the pressure at the outlet end 410 of the channel, and this pressure (force) differential causes the body to slide toward the outlet end and toward, and eventually against, the retainer 424. At this point, the state of the unidirectional-valve assembly 400 is an open state, which is like the state of the unidirectional-valve assembly 400 of FIG. 17 except that the unidirectional valve 418 is open, e.g., as shown in FIG. 19 (not closed as shown in FIG. 17).

Referring to FIGS. 10, 17, 18, and 19, after the unidirectional valve 418 opens, fluid is free to flow, and does flow, from the water-supply-and-distribution system, through one or both of the hot-fluid and cold-fluid inlets 64, through the unidirectional valve(s) 400, into the input ports of the mixer 102, out from the output port of the mixer and into the region 170, into and through the cavity 126, and out from the valve-opening-and-dispensing device 16 via the receptacle 20.

While the variable-temperature fluid valve 10 and unidirectional valve 418 remain open, the fluid pressure (force) (along with the force of the spring 422) on the body 414 at the inlet end 408 of the channel 406 continues to exceed the pressure at the outlet end 410 of the channel, and this pressure (force) differential continues to press the body against the retainer 424. That is, the unidirectional-valve assembly 400 remains in the open state, which, per above, is like the state of the unidirectional-valve assembly 400 of FIG. 17 except that the unidirectional valve 418 is open, e.g., as shown in FIG. 19 (not closed as shown in FIG. 17). Thereafter, the unidirectional-valve assembly 400 (and the unidirectional valve 418) remains open for as long as the variable-temperature fluid valve 10 remains open.

Referring to FIGS. 8 and 17, in response to one removing the valve-opening-and-fluid-dispensing device 16 from the receptacle 20, the combined forces of the water pressure in the region 170 from the water-supply-and-distribution system and the rod spring 100 close the variable-temperature fluid valve 10 by urging the piston 96 back into the cavity 126 such that the seal 98 reestablishes a fluid-tight seal with the inner wall 148 of the cavity. In response to the reestablishment of the fluid-tight seal between the seal 98 and the inner wall 148 of the cavity 126, the unidirectional-valve assembly 400 closes and attains the closed (e.g., resting) state shown in FIG. 17.

Referring to FIGS. 17-20, alternate embodiments are contemplated. For example, embodiments and alternate embodiments described elsewhere herein may be applicable to the unidirectional-valve assembly 400.

Figures 21, 22, 23:
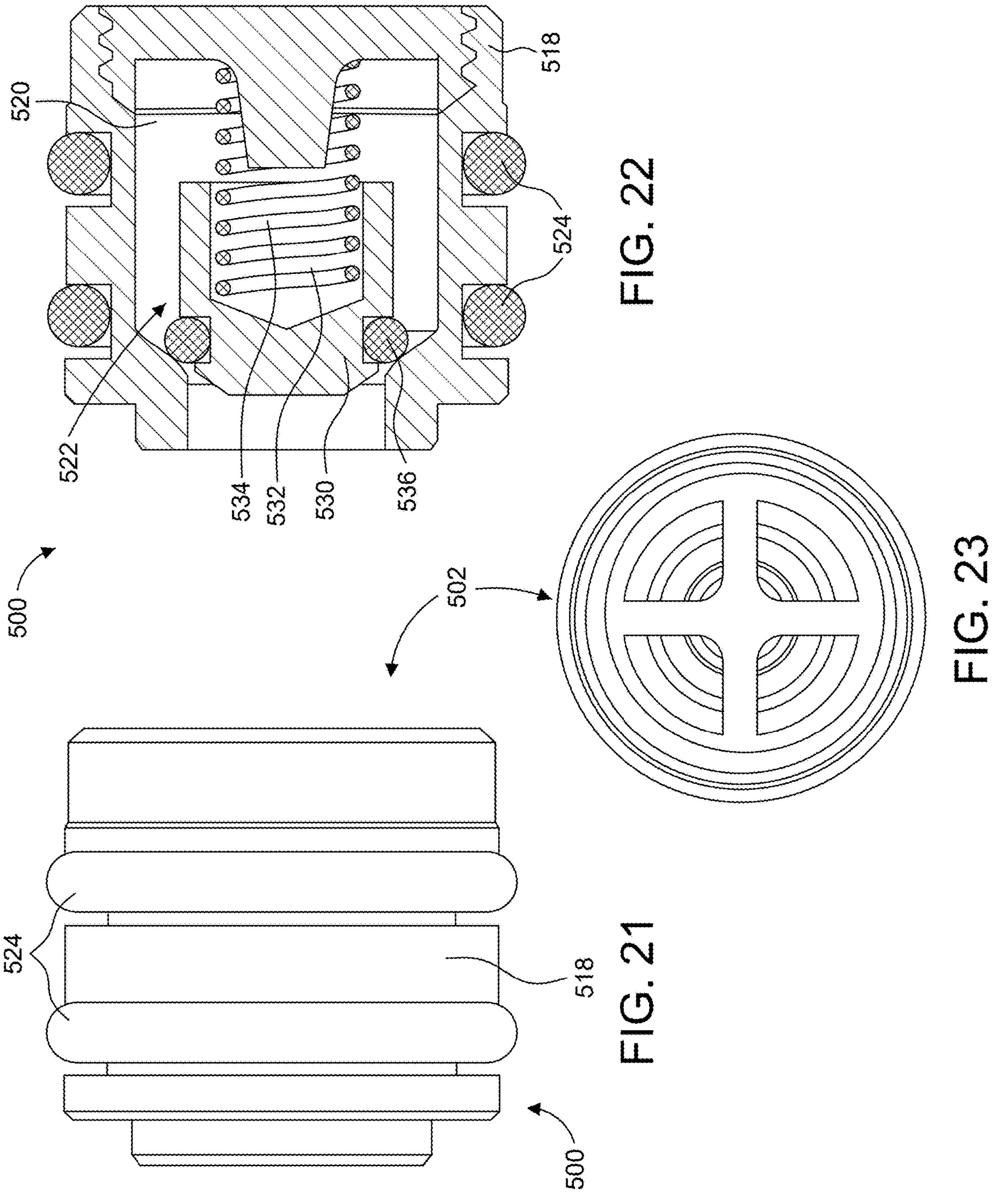
FIG. 21 is a side view of a body assembly for a unidirectional-valve assembly that is similar to the unidirectional valve assemblies of FIGS. 8-20, according to an embodiment.
FIG. 22 is a side view, with portions broken away, of the body assembly of FIG. 21, according to an embodiment.
FIG. 23 is an inner-end (e.g., fluid-valve-facing end) view of the body assembly of FIGS. 20-21, according to an embodiment.

FIG. 21 is a side view of a body assembly 500 for a unidirectional-valve assembly that is similar to the unidirectional-valve assemblies 180 and 182, 300, and 400 of FIGS. 9A-9B, 11A-11B, and 12-20, according to an embodiment.

FIG. 22 is a side view, with portions broken away, of the body assembly 500 of FIG. 20, according to an embodiment.

FIG. 23 is a view of an outlet end 502 of the body assembly 500 of FIGS. 20-21, according to an embodiment.

Figure 24:
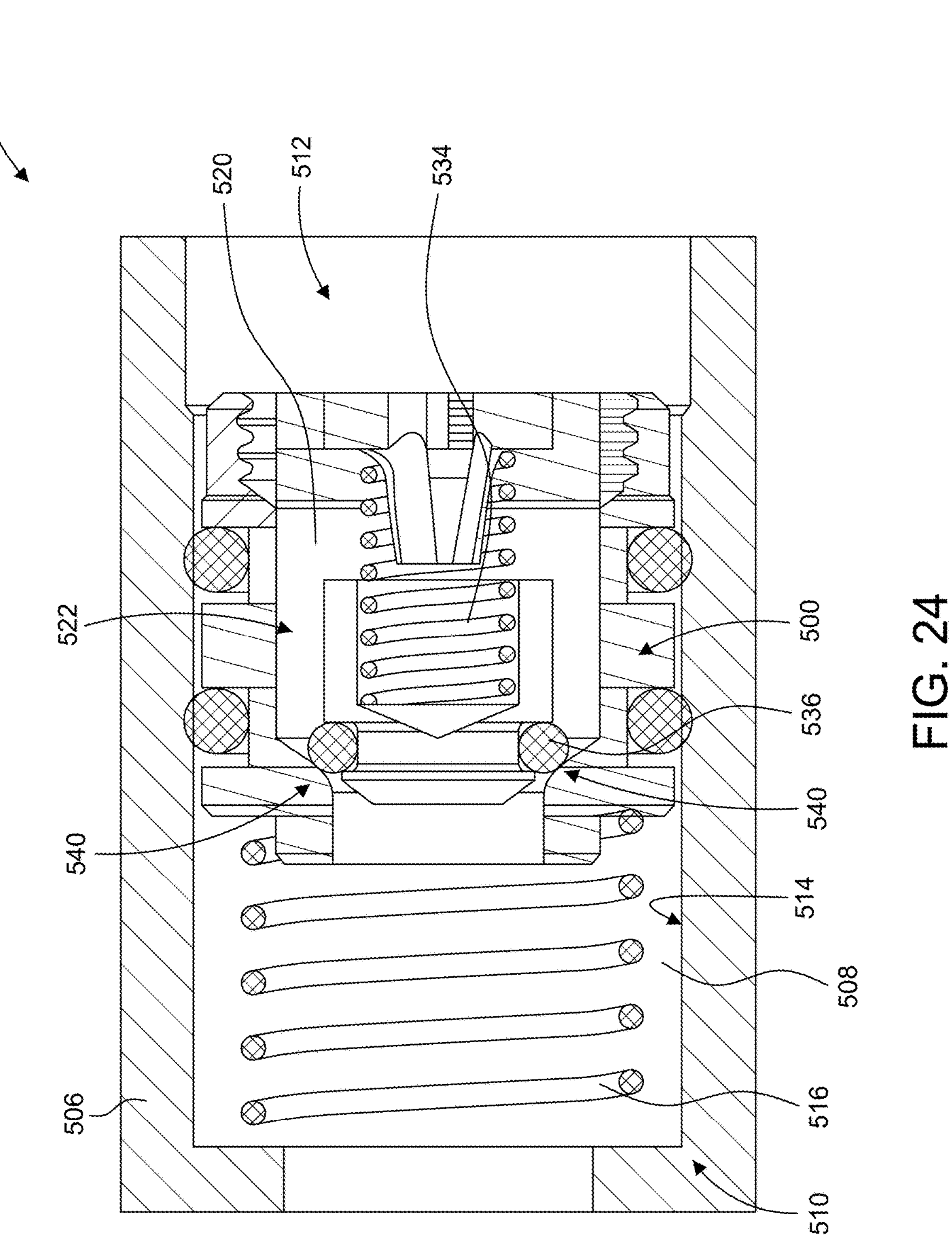
FIG. 24 is a side view, with portions broken away, of a unidirectional-valve assembly that includes the body assembly of FIGS. 21-23 in a rest state (e.g., the fluid valve is closed) before the valve-opening-and-fluid-dispensing device breaks the cavity seal, according to an embodiment.

FIG. 24 is a side view, with portions broken away, of a unidirectional-valve assembly 504, which includes the body assembly 500 of FIGS. 20-22, according to an embodiment. Where one or both of the unidirectional-valve assemblies 180 and 182 of FIGS. 8 and 10 are each replaced with a unidirectional-valve assembly 504, FIG. 24 is a view of the unidirectional valve-assembly 504 before the valve-opening-and-fluid-dispensing device 16 in inserted into the receptacle 20 of the variable-temperature fluid valve 10, according to an embodiment.

Figure 25:
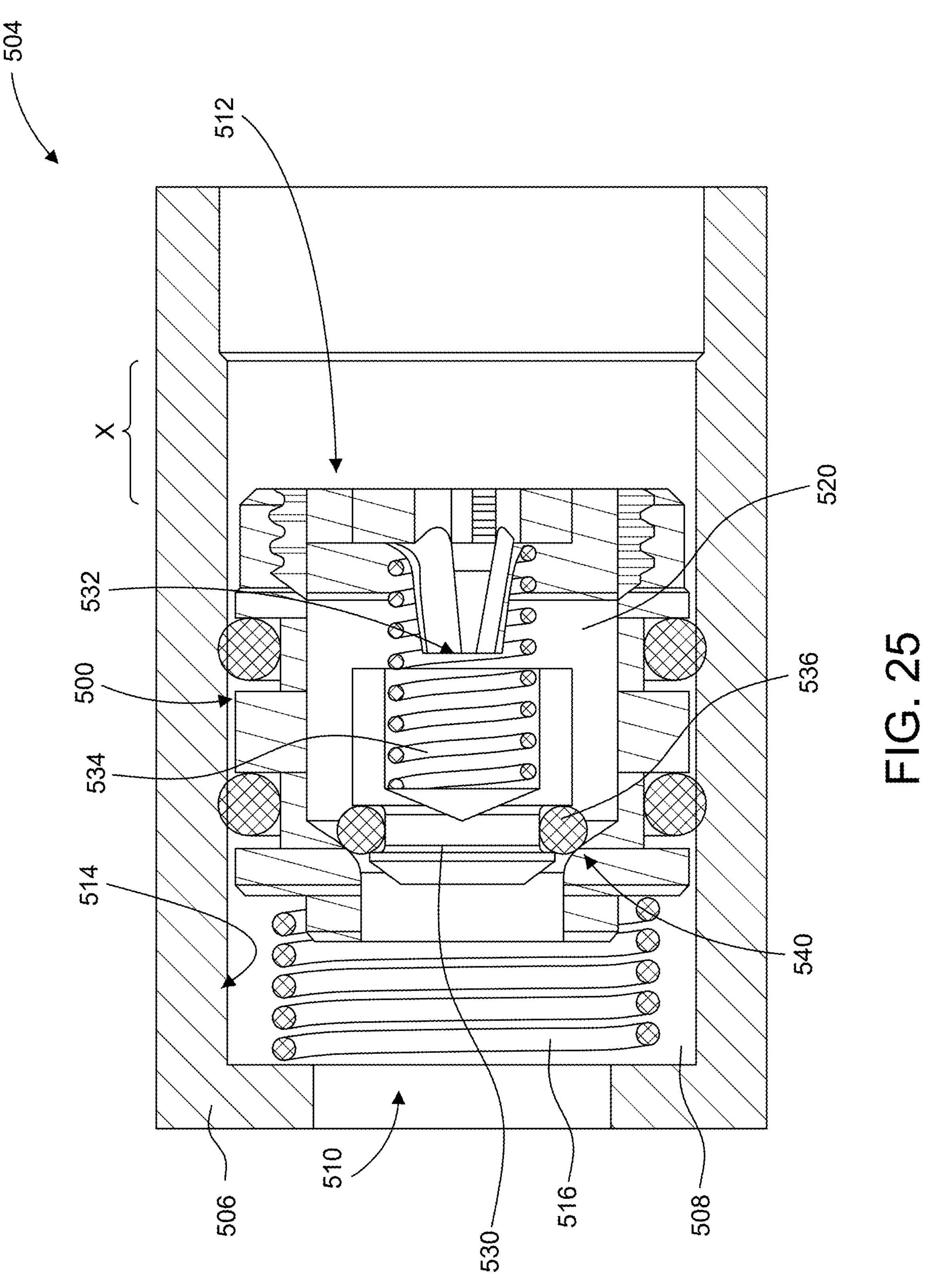
FIG. 25 is a side view, with portions broken away, of the unidirectional-valve assembly of FIG. 24 while the valve-opening-and-fluid-dispensing device is being inserted into the receptacle of the fluid valve and the cavity seal is intact and just (e.g., a fraction of a second) after the valve-opening-and-fluid-dispensing device breaks the cavity seal, according to an embodiment.

FIG. 25 is a side view, with portions broken away, of the unidirectional-valve assembly 504 of FIG. 24, according to an embodiment. Where one or both of the unidirectional-valve assemblies 180 and 182 of FIGS. 8 and 10 are each replaced with a unidirectional-valve assembly 504, FIG. 25 shows the state of the unidirectional-valve assembly(ies) 504 at a point in time while one is inserting the valve-opening-and-fluid-dispensing device 16 into the receptacle 20 of the variable-temperature fluid valve 10 (FIGS. 5, 8, and 10) (e.g., just before, or at the time that, the device 16 breaks the fluid-tight seal formed by the seal 98 and the inner cavity wall 148) or just (e.g., a fraction of a second) after the valve-opening-and-fluid-dispensing device breaks the fluid-tight seal formed by the seal 98 and inner cavity wall 148, according to an embodiment.

Figure 26:
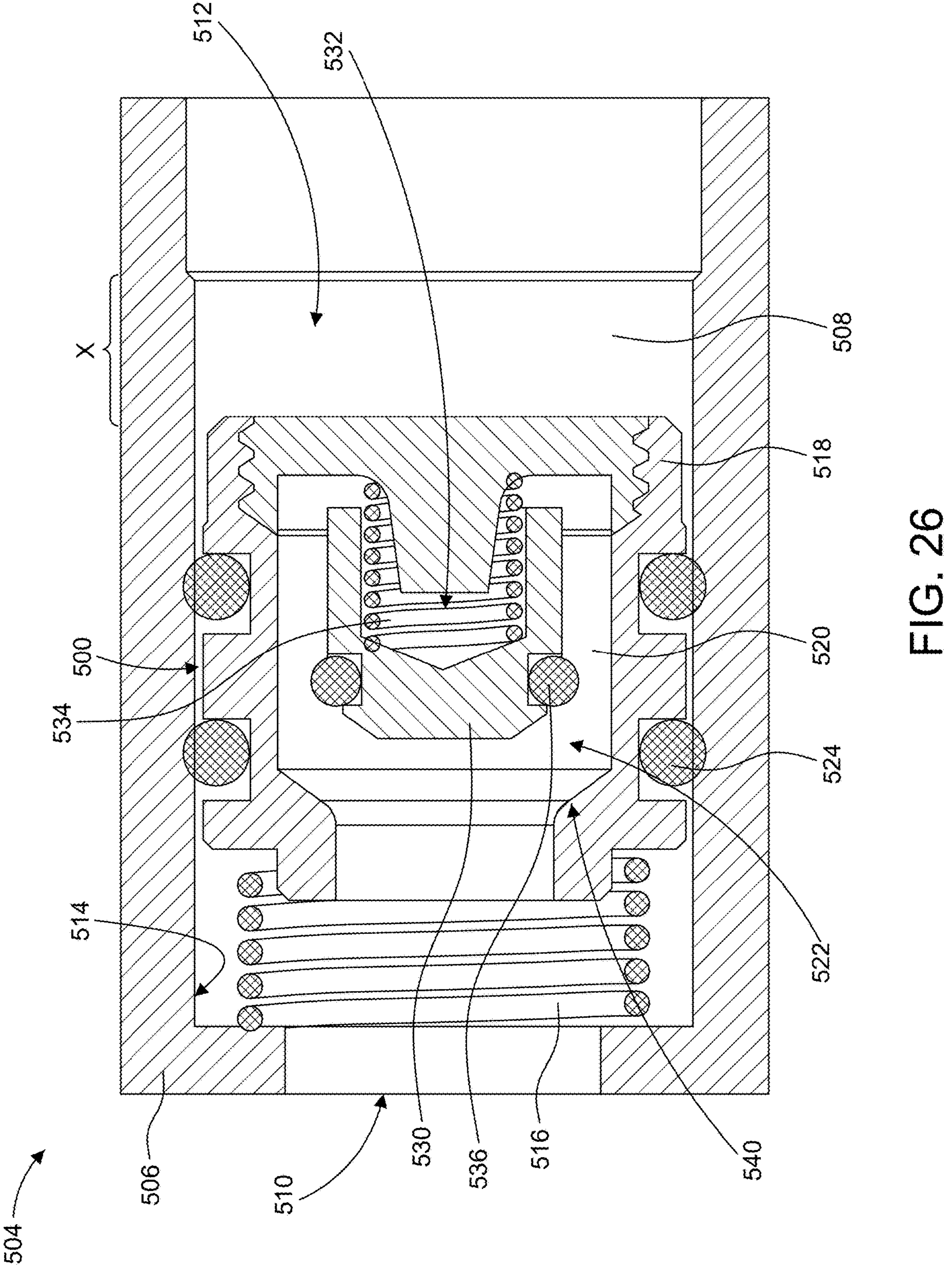
FIG. 26 is a side view, with portions broken away, of the unidirectional-valve assembly of FIGS. 24-25 while the fluid valve and the unidirectional-valve assembly are open just (e.g., a fraction of a second) after the valve-opening-and-fluid-dispensing device breaks the cavity seal but before the unidirectional-valve assembly is reset, according to an embodiment.

FIG. 26 is a side view, with portions broken away, of the unidirectional-valve assembly 504 of FIG. 25, according to an embodiment. Where one or both of the unidirectional-valve assemblies 180 and 182 of FIGS. 8 and 10 are each replaced with a unidirectional-valve assembly 504, FIG. 26 shows the state (unidirectional valve open) of the unidirectional-valve assembly(ies) 504 at a point in time just (e.g., a fraction of a second) after the valve-opening-and-fluid-dispensing device 16 breaks the fluid-tight seal formed by the seal 98 and inner cavity wall 148 (see FIG. 10), according to an embodiment.

Referring to FIGS. 24-26, the unidirectional-valve assembly 504 includes a sleeve 506 defining a channel 508 having an inlet end 510 and an outlet end 512, and an inner surface 514.

A spring 516 is disposed within the channel 508 and is configured to urge the body assembly 500 toward the outlet end 512 of the channel.

Referring to FIGS. 21-26, the body assembly 500 includes a body 518 configured for slidably disposing within the channel 508 and defines a cavity 520 within which is disposed a unidirectional valve (e.g., check valve) 522. Around the body 518 are one or more seals (e.g., one or more O-rings) 524, which each form a fluid-tight seal with the inner surface 514 of the channel 508.

The unidirectional-valve assembly 504 also includes a retainer (not visible in FIGS. 24-26) configured to stop the spring 516 and water pressure (e.g., from the water-supply-and-distribution system of the structure in which the temperature-variable fluid valve 10 is installed) from forcing the body assembly 500 out from the channel 508 via the inlet end 512 of the channel. The retainer may be secured to, or within, the sleeve 506 with threads or with other attachment means.

The unidirectional valve 522 includes a poppet 530 having a recess 532, a spring 534, and one or more seals (e.g., one or more O-rings) 536 disposed around the poppet.

And the sleeve 506 can include one or more seals (e.g., O-rings, not visible in FIGS. 24-26) disposed around it to form a fluid-tight seal with an opening in which the sleeve is installed (see, e.g., FIGS. 9A-9B and 11A-11B). Alternatively, the sleeve 506 may not be installed in an opening but can be a standalone component that does not require an opening to receive the sleeve.

Referring to FIGS. 8, 10, and 21-26, operation of the unidirectional-valve assembly 504 is described according to an embodiment in which each of one or both of the unidirectional-valve assemblies 180 and 182 of FIGS. 8 and 10 is replaced with a respective unidirectional-valve assembly 504.

Referring to FIGS. 8 and 24, while the valve-opening-and-fluid-dispensing device 16 is uninstalled, the piston 96 is positioned so that the seal 98 is inside of the cavity 126 and forms a fluid-tight seal with the inner wall 148 of the cavity. Consequently, no fluid flows into or through the cavity 126, and, therefore, the unidirectional-valve assembly 504 is in its inactive (e.g., resting) state in which the seal 536 forms a fluid-tight seal with an inner edge 540 of the cavity 520. That is, the unidirectional-valve assembly 504 is closed (e.g., in a closed state), meaning that the combination of the forces of the spring 516 and water pressure from the water-supply-and-distribution system (via the hot-fluid and cold-fluid inlets 64) urges the body assembly 500 all the way to, and against, the retainer (not visible in FIG. 24) at the outlet end 512 of the channel 508 (the retainer prevents the forces of the spring and water pressure from forcing the body out from the channel). And because there is no fluid flowing through the cavity 126 of the variable-temperature fluid valve 10, the unidirectional valve 522 is closed because the spring 534 forces the poppet 530 toward the inlet end 510 of the channel 508, and, therefore, forces the seal 536 toward and against the inner wall, or inner edge, 540 of the cavity 520 such that the seal 536 and the edge 540 form a fluid-tight seal.

Next, referring to FIGS. 8 and 10, during installation of the valve-opening-and-dispensing device 16, the piston 96 moves toward the end 218 of, and eventually moves out from, the cavity 126 (leftward in FIGS. 8 and 10), and this movement generates a backpressure in the region 170 of the variable-temperature fluid valve 10. As this piston-toward-end-of-and-out-from-cavity movement continues, at some time during this movement the seal 98 exits the cavity 126, thus breaking the fluid-tight seal between the seal 98 and the cavity wall 148, per FIG. 10.

Referring to FIGS. 8, 10, and 25, while the piston 96 is moving toward the end 218 of, and eventually out from, the cavity 126, and for a relatively short period of time (e.g., a fraction of a second) after the fluid-tight seal between the seal 98 and the cavity wall 148 breaks, a back pressure is generated in the region 170, and, via the output port and input ports of the mixer 102, this back pressure propagates to the unidirectional valve(s) 504. This force that this propagating back pressure generates on the body assembly 500 at the outlet end 512 of the channel 508 is, at least temporarily, greater than the combined force that the water-supply-and-distribution-system water pressure and the spring 516 generate on the body assembly at the inlet end 510 of the channel. Consequently, this force differential (caused by the aforementioned pressure differential) not only closes the unidirectional valve 522 (by urging the poppet 530 toward the inlet end 510 of the channel 508 and causing the seal 536 to form a fluid-tight seal with the inner edge 540 of the cavity 520), but also urges the body assembly 500 away from the outlet end 512 of the channel 508 toward the inlet end 510 of the channel, thus compressing the spring 516; that is, this force differential causes the body assembly 500 to slide toward the inlet end 510 of the channel 508 a distance x, which sliding relieves the back pressure in the region 170 of the variable-temperature fluid valve 10 sufficiently to reduce, or to eliminate, the impedance that the back pressure otherwise may present to one installing the valve-opening-and-fluid dispensing device 16 in the receptacle 20.

Referring to FIGS. 10 and 26, after the elapse of the relatively short period of time (e.g., a fraction of a second) from the breaking of the fluid-tight seal between the seal 98 and the inner wall 148 of the cavity 126, because the variable-temperature fluid valve 10 is open per FIG. 10 (e.g., the seal 98 is out from the cavity 126), the fluid pressure (force) (along with the force of the spring 516) on the body assembly 500 at the inlet end 510 of the channel 508 exceeds the pressure (force) at the outlet end 512 of the channel, and this pressure (force) differential opens the unidirectional valve 522 by forcing the poppet 530 toward the outlet end 512 of the channel 508 (the water pressure overcomes the force of the spring 534), thus breaking the fluid-tight seal formed by the seal 536 and the inner edge 540 of the cavity 520.

Furthermore, this pressure (force) differential causes the body 518 to slide toward the outlet end 512 of the channel 508 and toward, and, eventually, against the retainer (not visible in FIGS. 24-26) such that the unidirectional-valve assembly 504 has an open state that is similar to the state of the unidirectional-valve assembly in FIG. 24 but with the unidirectional valve 522 open as shown in FIG. 26.

Referring to FIGS. 10 and 24-26, after the unidirectional valve 522 opens, fluid is free to flow, and does flow, from the fluid-supply-and-distribution system, through one or both of the hot-fluid and cold-fluid inlets 64, through the unidirectional valve(s) 522, into the input ports of the mixer 102, out from the output port of the mixer and into the region 170, into and through the cavity 126, and out from the valve-opening-and-fluid-dispensing device 16 via the receptacle 20.

While the variable-temperature fluid valve 10 and unidirectional valve(s) 522 remain open, the fluid pressure (force) (along with the force of the spring 516) on the body assembly 500 at the inlet end 510 of the channel 508 continues to exceed the pressure (force) at the outlet end 512 of the channel, and this pressure (force) differential causes the body assembly 500 to slide toward the outlet end 512 and against the retainer (not visible in FIGS. 23-24). The unidirectional valve(s) 522 remain(s) in the open state for as long as the fluid valve 10 remains open. Per above, the open state of the unidirectional-valve assembly 504 is similar to the state of the unidirectional-valve assembly in FIG. 24 but with the unidirectional valve 522 open (the seal between the sealing ring 536 and the edge (surface) 540 broken) as shown in FIG. 26.

Referring to FIGS. 8 and 24, in response to one removing the valve-opening-and-fluid-dispensing device 16 from the receptacle 20 of the variable-temperature fluid valve 10, the combined forces of the water pressure in the region 170 from the fluid-supply-and-distribution system (of the structure in which the variable-temperature fluid valve is installed) and the rod spring 100 closes the variable-temperature fluid valve by urging the piston 96 back into the cavity 126 such that the seal 98 reestablishes a fluid-tight seal with the inner wall 148 of the cavity. In response to the reestablishment of the fluid-tight seal between the seal 98 and the inner wall 148 of the cavity 126, the unidirectional-valve assembly 504 closes and, therefore, is in a closed state such as shown in FIG. 24 (the spring 534 keeps the unidirectional valve 522 closed as shown in FIG. 24 by urging the poppet 530 toward the outlet end 510 of the channel 508, and, therefore, by urging the seal 536 against the inner edge 540 of the cavity 520 to form a fluid-tight seal).

Referring to FIGS. 21-26, alternate embodiments are contemplated. For example, embodiments and alternative embodiments disclosed elsewhere herein may be applicable to the unidirectional-valve assembly 504 and the body assembly 500.

Figure 27:
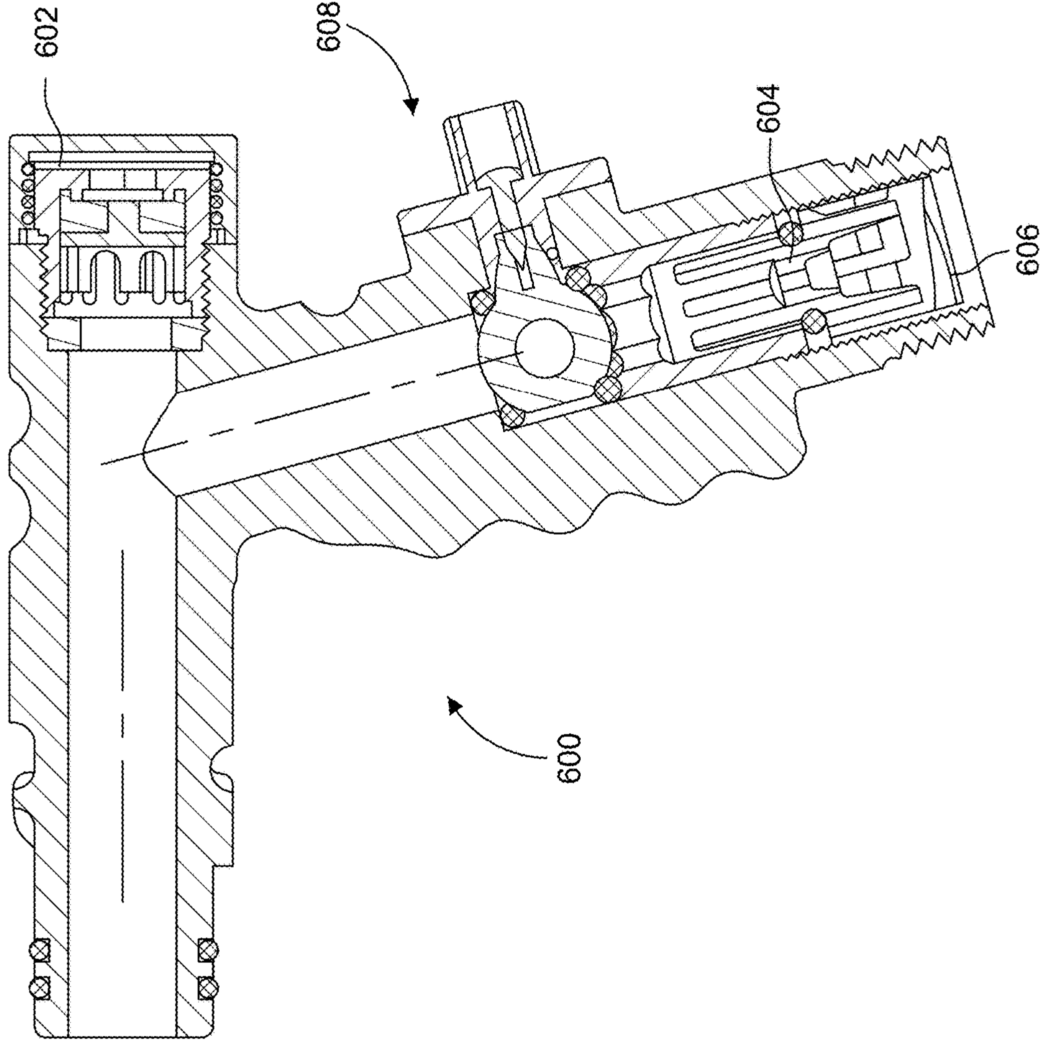
FIG. 27 is a side view, with portions broken away, of a valve-opening-and-fluid-dispensing device that can be similar to the valve-opening-and-fluid-dispensing devices of FIGS. 1, 6, 7A-7D, 8, and 10, according to an embodiment.

FIG. 27 is a side view, with portions broken away, of a valve-opening-and-fluid-dispensing device 600, which may be similar to the valve-opening-and-fluid-dispensing devices 16 and 130 of FIGS. 1, 6, 7A-7D, 8, and 10, and similar to the water spigot 190 disclosed in U.S. Pat. No. 11,242,673 (which is incorporated by reference), according to an embodiment. The valve-opening-and-fluid-dispensing device 600 includes an anti-siphon assembly 602, and a check-valve assembly 604. The antisiphon assembly 602 can be similar in configuration and operation to the anti-siphon assembly 20 of the '673 patent. The check-valve assembly 604 can be any conventional and suitable type of check-valve assembly or check valve, is configured to allow water to flow in only one direction from the variable-temperature fluid valve 10 (e.g., FIGS. 8 and 10)) out through a dispensing end 606 of the device 600. Therefore, the check-valve assembly 604 is configured to prevent back flow that might otherwise occur in response to a drop in fluid pressure within the fluid-supply-and-distribution system to which the variable-temperature fluid valve 10 (e.g., FIGS. 8 and 10) is connected. In an alternative embodiment, the valve-opening-and-fluid-dispensing device 600 includes one, but not both, of the anti-siphon assembly 602 and the check-valve assembly 604. Including one or both of the anti-siphon assembly 602 and the check-valve assembly 604 can render the device 600 suitable for use with a fluid valve (such as the variable-temperature fluid valve 10) that includes no anti-siphon assembly. For example, if the building code of a municipality requires that a structure's water-supply-and-distribution system include anti-siphon functionality, the device 600 can render the water-supply-and-distribution system building-code compliant even if connected to a fluid (e.g., water) valve (e.g., the variable-temperature fluid valve 10 of FIGS. 6, 8, and 10) that includes no anti-siphon assembly.

The valve-opening-and-fluid-dispensing device 600 also can include an on/off switch/valve 608.

Still referring to FIG. 27, alternate embodiments of the valve-opening-and-fluid-dispensing device 600 are contemplated. For example, embodiments and alternative embodiments disclosed elsewhere herein may be applicable to the valve-opening-and-fluid-dispensing device 600.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. Moreover, one or more components of a described apparatus or system may have been omitted from the description for clarity or another reason. In addition, one or more components of a described apparatus or system that have been included in the description may be omitted from the apparatus or system. Furthermore, one or more steps, acts, or other items of a described method or procedure may have been omitted from the description for clarity or another reason. Moreover, one or more steps, acts, or other items of a described method or procedure that have been included in the description may be omitted from the method or procedure. And although features and elements are described above in particular combinations, one of ordinary skill in the art will appreciate that each feature or element can be used alone or in any combination with the other features and elements.

What is claimed:

1. A fluid valve, comprising:

a receptacle having a protrusion configured to engage a groove of a valve-opening-and-fluid-dispensing device;

a cavity having a front end in communication with the receptacle and having a rear end;

a mixer having hot and cold input ports and having an output port in communication with the rear end of the cavity; and a valve assembly disposed in the cavity, configured to allow fluid to flow from the output port through the cavity in response to a valve-opening-and-fluid-dispensing device being disposed in the receptacle, and configured to prohibit fluid from flowing from the output port through the cavity in response to the valve-opening-and-fluid-dispensing device being absent from the receptacle.

2. The fluid valve of claim 1 wherein the receptacle has three protrusions substantially evenly spaced around the receptacle and each configured to engage a respective groove of the valve-opening-and-fluid-dispensing device.

3. The fluid valve of claim 1 wherein the valve assembly includes:

a piston;

a sealing ring disposed around the piston;

a piston-return spring configured to urge the sealing ring against a rear edge of the cavity in response to the valve-opening-and-fluid-dispensing device being absent from the receptacle;

a connecting rod having a first end coupled to the piston and having a second end; and a member coupled to the second end of the connecting rod and configured to urge, via the connecting rod and the piston, the sealing ring away from the rear edge of the cavity in response to the valve-opening-and-fluid-dispensing device being disposed in the receptacle.

4. The fluid valve of claim 1 wherein the valve assembly includes:

a piston;

a sealing ring disposed around the piston;

a piston-return spring configured to urge the sealing ring into the cavity in response to the valve-opening-and-fluid-dispensing device being absent from the receptacle;

a connecting rod having a first end coupled to the piston and having a second end; and a member coupled to the second end of the connecting rod and configured to urge, via the connecting rod and the piston, the sealing ring out from the cavity in response to the valve-opening-and-fluid-dispensing device being disposed in the receptacle.

5. The fluid valve of claim 1, further comprising a temperature control couplable to the mixer.

6. The fluid valve of claim 1, further comprising:

a face plate in which the receptacle is disposed; and a temperature control disposable over the face plate and couplable to the mixer.

7. The fluid valve of claim 1, further comprising:

a region disposed between the mixer output port and the rear end of the cavity;

the hot input port and/or the cold input port of the mixer being configured for communication with an inlet; and a unidirectional-valve assembly configured:

to prohibit a fluid from flowing into the inlet; and to relieve, within the region, a back pressure during insertion of the valve-opening-and-fluid-dispensing device into the receptacle.

8. The fluid valve of claim 1, further comprising:

the valve assembly including:

a piston;

a sealing ring disposed around the piston;

a piston-return spring configured to urge the sealing ring against a rear edge of the cavity in response to the valve-opening-and-fluid-dispensing device being absent from the receptacle;

a connecting rod having a first end coupled to the piston and having a second end; and a member coupled to the second end of the connecting rod and configured to urge, via the connecting rod and the piston, the sealing ring away from the rear edge of the cavity in response to the valve-opening-and-fluid-dispensing device being inserted into the receptacle;

a region disposed between the mixer output port and the rear end of the cavity;

the hot input port and/or the cold input port of the mixer being configured for communication with an inlet; and a unidirectional-valve assembly configured:

to prohibit a fluid from flowing into the inlet; and to relieve, within the region, a back pressure while the member is urging the sealing ring away from the rear edge of the cavity.

9. The fluid valve of claim 1, further comprising:

the valve assembly including:

a piston;

a sealing ring disposed around the piston;

a piston-return spring configured to urge the sealing ring into the cavity in response to the valve-opening-and-fluid-dispensing device being absent from the receptacle;

a connecting rod having a first end coupled to the piston and having a second end; and a member coupled to the second end of the connecting rod and configured to urge, via the connecting rod and the piston, the sealing ring out from the cavity in response to the valve-opening-and-fluid-dispensing device being inserted into the receptacle;

a region disposed between the mixer output port and the rear end of the cavity;

the hot input port and/or the cold input port of the mixer being configured for communication with an inlet; and a unidirectional-valve assembly configured:

to prohibit a fluid from flowing into the inlet; and to relieve, within the region, a back pressure while the member is urging the sealing ring out from the cavity.

10. The fluid valve of claim 1, further comprising:

a channel disposable in communication with one of the hot and cold input ports;

a body slidably disposable within the channel;

a spring disposable within the channel; and a unidirectional valve disposable within the body.

11. The fluid valve of claim 1, further comprising:

a region disposed between the mixer output port and the rear end of the cavity;

the hot and cold input ports of the mixer being configured for communication with hot and cold inlets; and unidirectional-valve assemblies configured:

to prohibit a fluid from flowing into the hot and cold inlets; and to relieve, within the region, a back pressure during insertion of the valve-opening-and-fluid-dispensing device into the receptacle.

12. The fluid valve of claim 1, further comprising:

the valve assembly including:

a piston;

a sealing ring disposed around the piston;

a piston-return spring configured to urge the sealing ring into the cavity in response to the valve-opening-and-fluid-dispensing device being absent from the receptacle;

a connecting rod having a first end coupled to the piston and having a second end; and a member coupled to the second end of the connecting rod and configured to urge, via the connecting rod and the piston, the sealing ring out from the cavity in response to the valve-opening-and-fluid-dispensing device being inserted into the receptacle;

a region disposed between the mixer output port and the rear end of the cavity;

the hot and cold input ports of the mixer being configured for communication with hot and cold inlets; and unidirectional-valve assemblies configured:

to prohibit a fluid from flowing into the hot and cold inlets; and to relieve, within the region, a back pressure while the member is urging the sealing ring out from the cavity.

13. The fluid valve of claim 1, further comprising:

a region disposed between the mixer output port and the rear end of the cavity; and a pressure-relief assembly configured to relieve, within the region, a back pressure during insertion of the valve-opening-and-fluid-dispensing device into the receptacle.

14. A method, comprising:

inserting a valve-opening-and-fluid-dispensing device into a receptacle of a fluid valve by engaging a groove of the device with a protrusion of the receptacle;

in response to inserting the valve-opening-and-fluid-dispensing device into the receptacle, allowing a fluid to flow from a cold input port of a mixer and/or a hot input port of the mixer to an output port of the mixer, through a cavity and the receptacle, and out from the valve-opening-and-fluid-dispensing device; and adjusting, with the mixer, a ratio of a flow of fluid from the cold input port to the output port to a flow of fluid from the hot input port to the output port.

15. The method of claim 14 wherein allowing the fluid to flow includes urging a sealing ring toward a rear edge of the cavity.

16. The method of claim 14, further comprising stopping the fluid from flowing by urging a sealing ring into the cavity in response to removing the valve-opening-and-fluid-dispensing device from the receptacle by disengaging the groove from the protrusion.

17. The method of claim 14 wherein adjusting the ratio adjusts a temperature of the fluid flowing from the output port of the mixer.

18. The method of claim 14, further comprising:

prohibiting fluid from flowing into a fluid inlet coupled to the hot input port or the cold input port of the mixer; and while inserting the valve-opening-and-fluid-dispensing device into the receptacle, limiting back pressure within a region disposed between the mixer output port and the cavity.

19. The method of claim 14, further comprising:

wherein allowing the fluid to flow includes urging a sealing ring out from the cavity;

prohibiting fluid from flowing into a fluid inlet coupled to the hot input port or the cold input port of the mixer; and while urging the sealing ring out from the cavity, limiting back pressure within a region disposed between the mixer output port and the cavity.

20. A structure, comprising:

a water-supply-and-distribution system having hot- and cold-water outlets;

an exterior partition;

a water valve disposed in the exterior partition and including:

hot- and cold-water inlets coupled to the hot- and cold-water outlets;

a receptacle having a protrusion configured to engage a groove of a valve-opening-and-water-dispensing device;

a cavity having a front end in communication with the receptacle and having a rear end;

a mixer having hot- and cold-water input ports coupled to the hot- and cold-water inlets and having an output port in communication with the rear end of the cavity; and a valve assembly disposed in the cavity, configured to allow fluid to flow from the output port through the cavity in response to a valve-opening-and-water-dispensing device being disposed in the receptacle, and configured to prohibit water from flowing from the output port through the cavity in response to the valve-opening-and-water-dispensing device being absent from the receptacle.

21. The structure of claim 20 wherein the valve further comprises:

a face plate in which the receptacle is disposed; and a wedge disposed between the face plate and the exterior partition and configured to angle the cavity relative to the exterior partition such that fluid in the cavity drains, due to gravity, toward the receptacle in response to the valve-opening-and-water-dispensing device being absent from the receptacle.

22. The structure of claim 20 wherein the valve further comprises:

a face plate in which the receptacle is disposed; and a temperature-control dial disposable in front of the face plate and configured to allow one to rotate a temperature control by rotating the temperature-control dial.

23. The structure of claim 20 wherein the valve further comprises:

a region disposed between the mixer output port and the rear end of the cavity; and unidirectional-valve assemblies disposed between the hot- and cold-water input ports and the hot- and cold-water outlets and configured:

to prohibit water from flowing into the hot- and cold-water outlets; and to relieve, within the region, a back pressure during insertion of the valve-opening-and-water-dispensing device into the receptacle.

* * * * *